(12) United States Patent
Katakura et al.

(10) Patent No.: US 7,840,329 B2
(45) Date of Patent: Nov. 23, 2010

(54) AUTOMATIC TRANSMISSION, AND APPARATUS AND METHOD OF CONTROLLING THE SAME

(75) Inventors: Shusaku Katakura, Kanagawa (JP);
Masaaki Uchida, Kanagawa (JP);
Yoshinobu Kawamoto, Kanagawa (JP);
Tomoaki Honma, Kanagawa (JP);
Sadamu Fujiwara, Kanagawa (JP)

(73) Assignee: Jatco Ltd, Fuji-shi (JP)

( * ) Notice: Subject to any disclaimer, the term of this patent is extended or adjusted under 35 U.S.C. 154(b) by 659 days.

(21) Appl. No.: 11/776,902

(22) Filed: Jul. 12, 2007

(65) Prior Publication Data
US 2008/0021622 A1    Jan. 24, 2008

(30) Foreign Application Priority Data
Jul. 18, 2006    (JP) .............................. 2006-196135

(51) Int. Cl.
*G06F 7/00* (2006.01)
(52) U.S. Cl. .......................................... 701/61; 477/109
(58) Field of Classification Search ................. 477/109, 477/143; 701/61
See application file for complete search history.

(56) References Cited

U.S. PATENT DOCUMENTS

| 4,707,789 A | * | 11/1987 | Downs et al. | ................. 701/58 |
| 5,407,401 A | * | 4/1995 | Bullmer et al. | ............. 477/110 |
| 6,390,949 B1 | | 5/2002 | Kondo et al. | |
| 7,351,183 B2 | * | 4/2008 | Fujii et al. | ................. 477/109 |
| 2002/0025885 A1 | * | 2/2002 | Saito et al. | ................. 477/143 |
| 2008/0139362 A1 | * | 6/2008 | Fujii et al. | ................. 477/109 |

FOREIGN PATENT DOCUMENTS

| JP | 6-174069 A | 6/1994 |
| JP | 9-68267 A | 3/1997 |
| JP | 10-47469 A | 2/1998 |
| JP | 10-59022 A | 3/1998 |
| JP | 10-184410 | 7/1998 |
| JP | 11-270665 A | 10/1999 |
| JP | 2001-65679 A | 3/2001 |

* cited by examiner

*Primary Examiner*—Mark Hellner
(74) *Attorney, Agent, or Firm*—Foley & Lardner LLP

(57) ABSTRACT

An automatic transmission includes at least an input section, an output section, first and second frictional engagement elements, and a controller. The input section receives an input torque from a drive unit. The first frictional engagement element has an engaged state allowing the output section to rotate at a first transmission gear ratio with respect to the input section. The second frictional engagement element has an engaged state allowing the output section to rotate at a second transmission gear ratio with respect to the input section. The controller controls at least a gear shift from the first transmission gear ratio to the second transmission gear ratio. The controller controls the first and second frictional engagement elements and the drive unit so as to cancel an inertia torque resulting from the gear shift.

25 Claims, 18 Drawing Sheets

AUTOMATIC TRANSMISSION, AND APPARATUS AND METHOD OF CONTROLLING THE SAME

BACKGROUND OF THE INVENTION

The present invention relates generally to an automatic transmission with a plurality of frictional engagement elements, and an apparatus and method for controlling such an automatic transmission, and more particularly to canceling an inertia torque caused due to change in a rotational state during a gear shift.

In general, a gear shift of an automatic transmission requires shifting a frictional engagement element such as a clutch from a disengaged state to an engaged state or from an engaged state to disengaged state. It is desired to carry out such a gear shift smoothly and quickly so as to cause no gear shift shock, by suitably operating the frictional engagement element. In the case of an upshift of an automatic transmission, it is desired to absorb an inertia torque caused due to change in a rotational state of the automatic transmission.

Japanese Patent Application Publication No. 10-184410 shows a technique for an upshift of an automatic transmission. According to this technique, an upshift is implemented by engaging a to-be-engaged clutch by supplying a fluid pressure $P_A$, and by disengaging a to-be-disengaged clutch by stopping to supply a fluid pressure $P_B$. This clutch changeover is implemented by increasing the fluid pressure $P_A$ toward a target value $P_{TA}$, and then by increasing the fluid pressure $P_A$ at a rate of change $\Delta P_{TA}$ until a change in an input speed is actually detected ($\Delta N \geq dNs$) after the fluid pressure $P_A$ reaches the target value $P_{TA}$. The target value $P_{TA}$, which is corresponding to a state just before the input speed starts to change, is calculated on the basis of an input torque. The rate of change $\Delta P_{TA}$ is calculated on the basis of a target rate of change of the input speed. When the fluid pressure $P_A$ reaches the target value $P_{TA}$, an engine torque TC starts to be reduced. The reduction of engine torque TC serves to absorb an inertia torque caused due to change in the input speed.

SUMMARY OF THE INVENTION

An automatic transmission may be subject to situations where it is impossible to absorb an inertia torque caused due to change in a rotational state. The situations include one where an accelerator pedal is little depressed or completely released so that no further engine torque reduction is possible, because the engine torque is already minimum.

In such situations, an upshift is implemented by allowing the inertia torque to fall due to friction, or by abandoning absorption of the inertia torque to cause a gear shift shock. Such a sufficient fall of the inertia torque due to friction requires a relatively long time interval. When the automatic transmission is applied to a motor vehicle, such a gear shift shock may adversely affects the shift feel and ride quality, and cause hard tears and damages in the automatic transmission.

Accordingly, it is an object of the present invention to provide an automatic transmission, a shift control apparatus and method for controlling an automatic transmission, which is capable of carrying out a gear shift quickly and smoothly by absorbing an inertia torque caused due to change in a rotational state during a gear shift even in situations where it is impossible to absorb all of the inertia torque only by engine torque reduction.

According to one aspect of the present invention, an automatic transmission comprises: an input section for receiving an input torque from a drive unit; an output section; a first frictional engagement element having an engaged state allowing the output section to rotate at a first transmission gear ratio with respect to the input section; a second frictional engagement element having an engaged state allowing the output section to rotate at a second transmission gear ratio with respect to the input section; and a controller for controlling a gear shift from the first transmission gear ratio to the second transmission gear ratio, the controller being configured to control the first and second frictional engagement elements so as to cancel at least a first portion of an inertia torque resulting from the gear shift. The controller may be configured to control the drive unit so as to cancel a second portion of the inertia torque. The controller may be configured to: control the first and second frictional engagement elements so as to cancel the inertia torque other than the second portion; determine a maximum possible value of the second portion of the inertia torque; when the maximum possible value is equal to a non-zero value, determine a distribution ratio smaller than one and larger than zero; and determine the second portion of the inertia torque by multiplying the inertia torque by the distribution ratio. The controller may be configured to change the distribution ratio gradually with time toward zero, when the maximum possible value of the second portion of the inertia torque is equal to zero. The controller may be configured to determine the second portion of the inertia torque by multiplying the inertia torque by the distribution ratio, when the maximum possible value of the second portion of the inertia torque is larger than zero and smaller than a reference value. The controller may be configured to change the distribution ratio gradually with time toward one, when the maximum possible value of the second portion of the inertia torque is larger than a reference value. The gear shift may be a downshift, and the controller may be configured to control the drive unit so as to cancel all of the inertia torque. The controller may be configured to compensate for delay in response of the drive unit and the first and second frictional engagement elements, when controlling the drive unit and the first and second frictional engagement elements. The gear shift may be an upshift; the first frictional engagement element may have a disengaged state allowing the output section to rotate at the second transmission gear ratio with respect to the input section; the second frictional engagement element may have a disengaged state allowing the output section to rotate at the first transmission gear ratio with respect to the input section; and the controller may be configured to control the first and second frictional engagement elements toward their respective engaged states in parallel so as to cancel the first portion of the inertia torque. The controller may be configured to: control the drive unit so as to cancel a second portion of the inertia torque; maximize the second portion of the inertia torque; and control the first and second frictional engagement elements so as to cancel the inertia torque other than the second portion. The controller may be configured to: determine first and second torque capacity corrections in accordance with the first and second transmission gear ratios; and implement the controlling the first and second frictional engagement elements by correcting a torque capacity of the first frictional engagement element by the first torque capacity correction, and by correcting a torque capacity of the second frictional engagement element by the second torque capacity correction. The controller may be configured to determine the first and second torque capacity corrections by using the following equations:

$$\Delta C_1 = \frac{r_2}{r_2 - r_1} I_{in} \dot{\omega}_{in}$$
$$\Delta C_2 = \frac{r_1}{r_2 - r_1} I_{in} \dot{\omega}_{in}$$

where: $\Delta C_1$ represents the first torque capacity correction; $\Delta C_2$ represents the second torque capacity correction; $r_1$ represents the first transmission gear ratio; $r_2$ represents the second transmission gear ratio; and $I_{in} \dot{\omega}_{in}$ represents the at least a first portion of the inertia torque. The controller may be configured to correct the first and second torque capacity corrections by multiplying by a correction factor smaller than one. The controller may be configured to vary the correction factor in accordance with a vehicle speed of a motor vehicle. The controller may be configured to: determine whether or not a condition that an input speed of the first frictional engagement element is lower than an output speed thereof and an input speed of the second frictional engagement element is higher than an output speed thereof holds; and when determining that the condition holds, control the first and second frictional engagement elements toward their respective engaged states in parallel so as to cancel the first portion of the inertia torque. The controller may be configured to: determine a desired path of change of an input speed through the gear shift; determine a target rate of change of the input speed in accordance with the desired path; and determine the inertia torque in accordance with the target rate of change of the input speed. The controller may be configured to: store information concerning a desired dynamic characteristic of rate of change of an input speed; determine an overall speed change of the input speed resulting from the gear shift; determine a target rate of change of the input speed in accordance with the overall speed change and the desired dynamic characteristic; and determine the inertia torque in accordance with the target rate of change of the input speed. The controller may be configured to determine the overall speed change as a difference between an output speed of the first frictional engagement element and an output speed of the second frictional engagement element. The controller may be configured to: store a value of an input speed of the second frictional engagement element when the gear shift starts; and determine the overall speed change as a difference between the stored value and an output speed of the second frictional engagement element. The controller may be configured to: determine a first reference speed in accordance with the first transmission gear ratio and a speed of the output section; determine a second reference speed in accordance with the second transmission gear ratio and the speed of the output section; and determine the overall speed change as a difference between the first and second reference speeds. The controller may be configured to: store a value of an input speed of the second frictional engagement element when the gear shift starts; determine a reference speed in accordance with the second transmission gear ratio and a speed of the output section; and determine the overall speed change as a difference between the stored value and the reference speed.

According to another aspect of the invention, an apparatus of controlling an automatic transmission comprising: an input section for receiving an input torque from a drive unit; an output section; a first frictional engagement element having an engaged state allowing the output section to rotate at a first transmission gear ratio with respect to the input section; and a second frictional engagement element having an engaged state allowing the output section to rotate at a second transmission gear ratio with respect to the input section, comprises: a controller for controlling a gear shift from the first transmission gear ratio to the second transmission gear ratio, the controller being configured to control the first and second frictional engagement elements so as to cancel at least a first portion of an inertia torque resulting from the gear shift.

According to a further aspect of the invention, a method of controlling an automatic transmission comprising: an input section for receiving an input torque from a drive unit; an output section; a first frictional engagement element having an engaged state allowing the output section to rotate at a first transmission gear ratio with respect to the input section; a second frictional engagement element having an engaged state allowing the output section to rotate at a second transmission gear ratio with respect to the input section; and a controller for controlling a gear shift from the first transmission gear ratio to the second transmission gear ratio, comprises: controlling the first and second frictional engagement elements so as to cancel at least a first portion of an inertia torque resulting from the gear shift.

DETAILED DESCRIPTION OF THE INVENTION

First, the following describes a principle and a basic construction of an automatic transmission with a shift control apparatus in accordance with embodiments of the present invention with reference to FIGS. 1 to 5. The term "speed" henceforth denotes a rotational speed in general. The automatic transmission includes a plurality of frictional engagement elements (clutches), transmitting a rotation from an engine (external drive unit) to a drive wheel set not shown by engagement of some of the frictional engagement elements. The shift control apparatus controls gear shifts of the automatic transmission.

Figure 2:
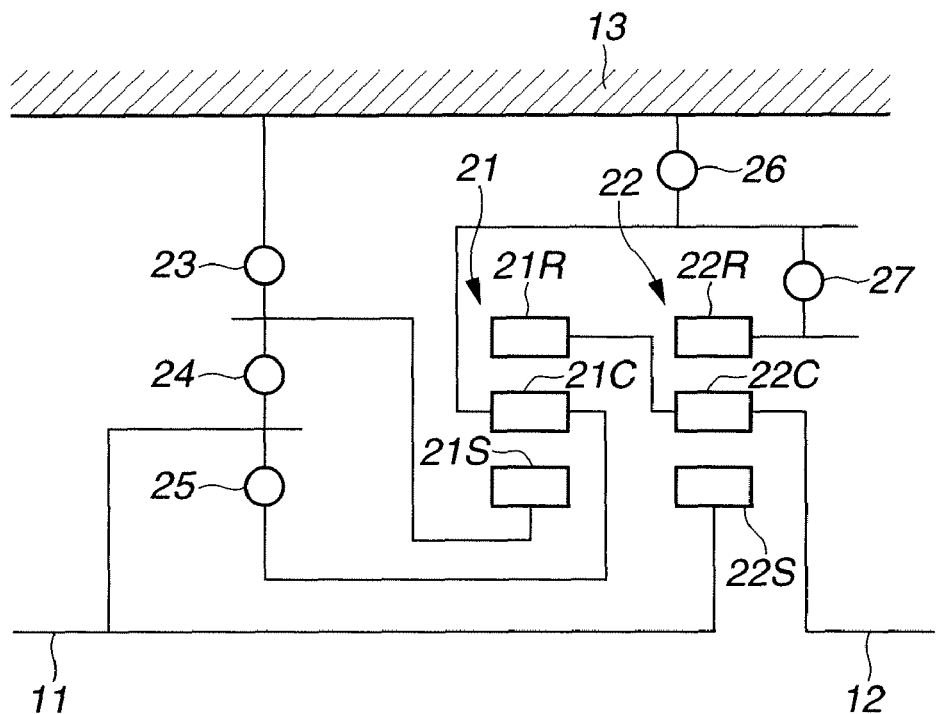
FIG. 2 is a schematic diagram showing a gear arrangement of an automatic transmission in accordance with the embodiments.

FIG. 2 schematically shows a gear arrangement of a four-speed automatic transmission. As shown in FIG. 2, the automatic transmission includes an input shaft 11 and an output shaft 12 disposed on first and second axial ends, respectively, and first and second planetary gears 21 and 22 disposed in series between input shaft 11 and output shaft 12. First planetary gear 21 includes a sun gear 21S, a ring gear 21R and a carrier 21C for carrying a planet pinion set in meshed contact with sun gear 21S and ring gear 21R. Second planetary gear 22 includes a sun gear 22S, a ring gear 22R and a carrier 22C for carrying a planet pinion set in meshed contact with sun gear 22S and ring gear 22R.

Disposed between sun gear 21S and a casing 13, a clutch (brake) 23 as a frictional engagement element has an engaged state allowing the sun gear 21S to be held stationary against rotation. Disposed between sun gear 21S and input shaft 11, a clutch 24 as a frictional engagement element has an engaged state allowing the sun gear 21S to rotate with input shaft 11 as a unit. Disposed between carrier 21C and input shaft 11, a clutch 25 has an engaged state allowing the carrier 21C to rotate with input shaft 11 as a unit. Disposed between carrier 21C and casing 13, a clutch (brake) 26 has an engaged state allowing the carrier 21C to be held stationary against rotation. Disposed between carrier 21C and ring gear 22R, a clutch 27 has an engaged state allowing the carrier 21C to rotate with ring gear 22R as a unit. Ring gear 21R is fixedly coupled to carrier 22C. Sun gear 22S is fixedly coupled to input shaft 11. Carrier 22C is fixedly coupled to output shaft 12.

Figure 3:
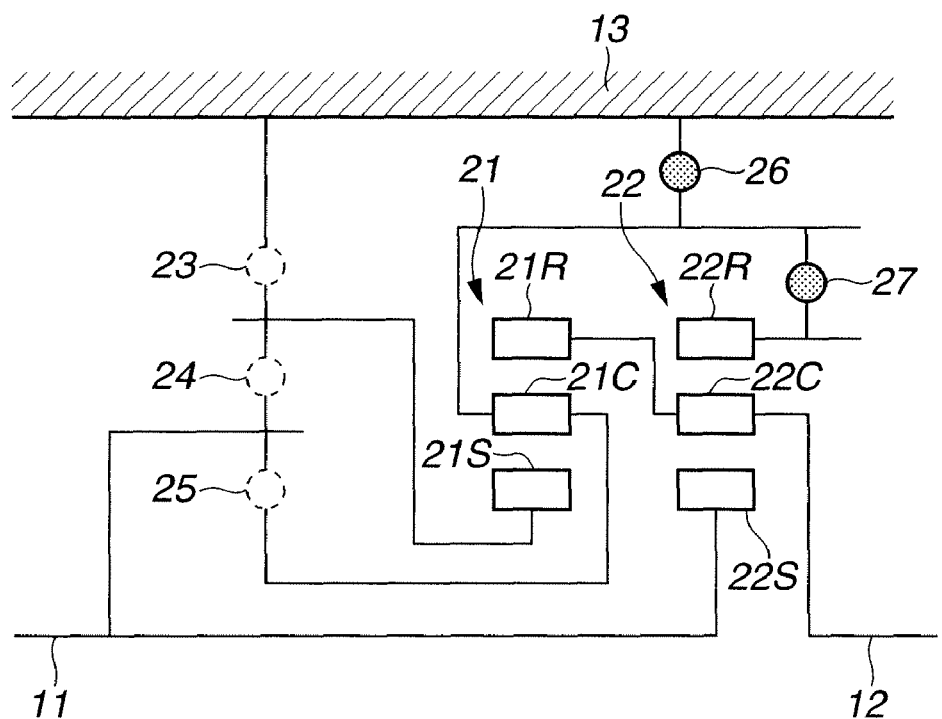
FIG. 3 is a schematic diagram showing a state of the automatic transmission of FIG. 2.
Figure 4:
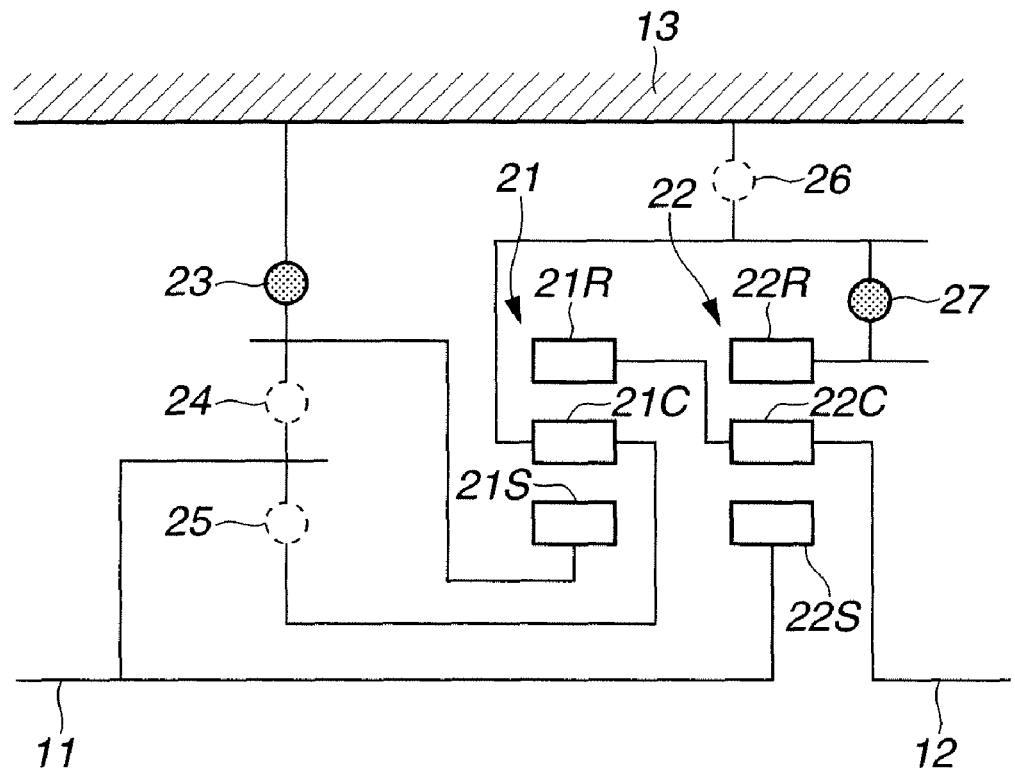
FIG. 4 is a schematic diagram showing another state of the automatic transmission of FIG. 2.

FIG. 3 shows the foregoing automatic transmission in first gear where clutches 26 and 27 are engaged, and clutches 23, 24 and 25 are disengaged. FIG. 4 shows the automatic transmission in second gear where clutches 23 and 27 are engaged, and clutches 24, 25 and 26 are disengaged. Accordingly, a shift from first gear to second gear is implemented by maintaining the clutch 27 in the engaged state, maintaining the clutches 24 and 25 in the respective disengaged states, shifting the clutch 26 from the engaged state into the disengaged state, and shifting the clutch 23 from the disengaged state into the engaged state.

Figure 5:
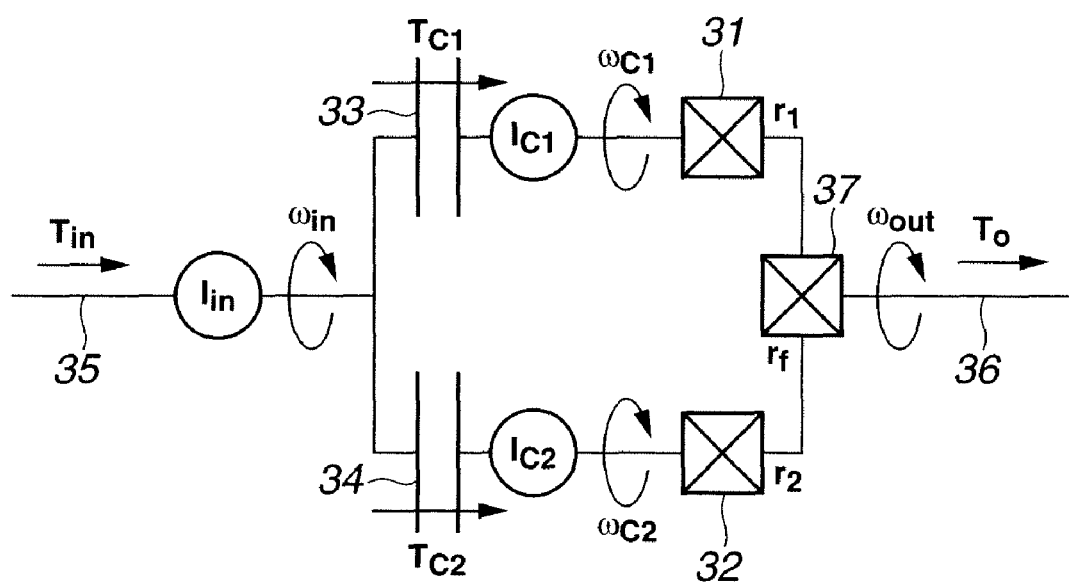
FIG. 5 is a schematic diagram showing an analogous automatic transmission having a simplified construction in relation to a gear shift concerned in the embodiments.

FIG. 5 schematically shows an analogous automatic transmission having a simplified construction in relation to the gear shift shown in FIGS. 3 and 4. This automatic transmission includes an input shaft 35, an output shaft 36, and two parallel power paths therebetween. Input shaft 35 serves as an input section for receiving an input torque from a drive unit. Output shaft 36 serves as an output section for outputting an output torque. One of the power paths includes a first clutch 33 and a gear arrangement 31 arranged in series. The other power path includes a second clutch 34 and a gear arrangement 32 arranged in series. Gear arrangement 31 allows output shaft 36 to rotate at a transmission gear ratio $r_1$ with respect to input shaft 35 in first gear. Gear arrangement 32 allows output shaft 36 to rotate at a transmission gear ratio $r_2$ with respect to input shaft 35 in second gear. First clutch 33 is selectively connected on one side to input shaft 35, and on the other side to output shaft 36 through the gear arrangement 31 and a final gear 37. Similarly, second clutch 34 is selectively connected on one side to input shaft 35, and on the other side to output shaft 36 through the gear arrangement 32 and final gear 37. Final gear 37 gives a gear ratio $r_f$ which is assumed to be equal to one in the following. In other words, first clutch 33 has an engaged state allowing the output shaft 36 to rotate at transmission gear ratio $r_1$ with respect to input shaft 35, and a disengaged state allowing the output shaft 36 to rotate at transmission gear ratio $r_2$ with respect to input shaft 35, while second clutch 34 has an engaged state allowing the output shaft 36 to rotate at transmission gear ratio $r_2$ with respect to input shaft 35, and a disengaged state allowing the output shaft 36 to rotate at transmission gear ratio $r_1$ with respect to input shaft 35.

The shift from first gear to second gear in the four-speed automatic transmission of FIGS. 2 to 4 is considered to be implemented by a process analogous to a process including shifting the first clutch 33 from the engaged state into the disengaged state, and shifting the second clutch 34 from the disengage state into the engaged state in the two-speed automatic transmission of FIG. 5. This process is referred to as "clutch changeover". Such a gear shift requires changes in rotational speed of internal rotating members, and thereby causes an inertia torque. In the case of an upshift, the internal rotating members rotate more slowly after the upshift than before the upshift. Accordingly, such an upshift causes a positive inertia torque. It is desired to cancel (absorb, for an upshift) such an inertia torque. In order to cancel such an inertia torque, an inertia control phase (inertia phase) is provided before or after a clutch changeover phase as described below in detail.

Figure 6:
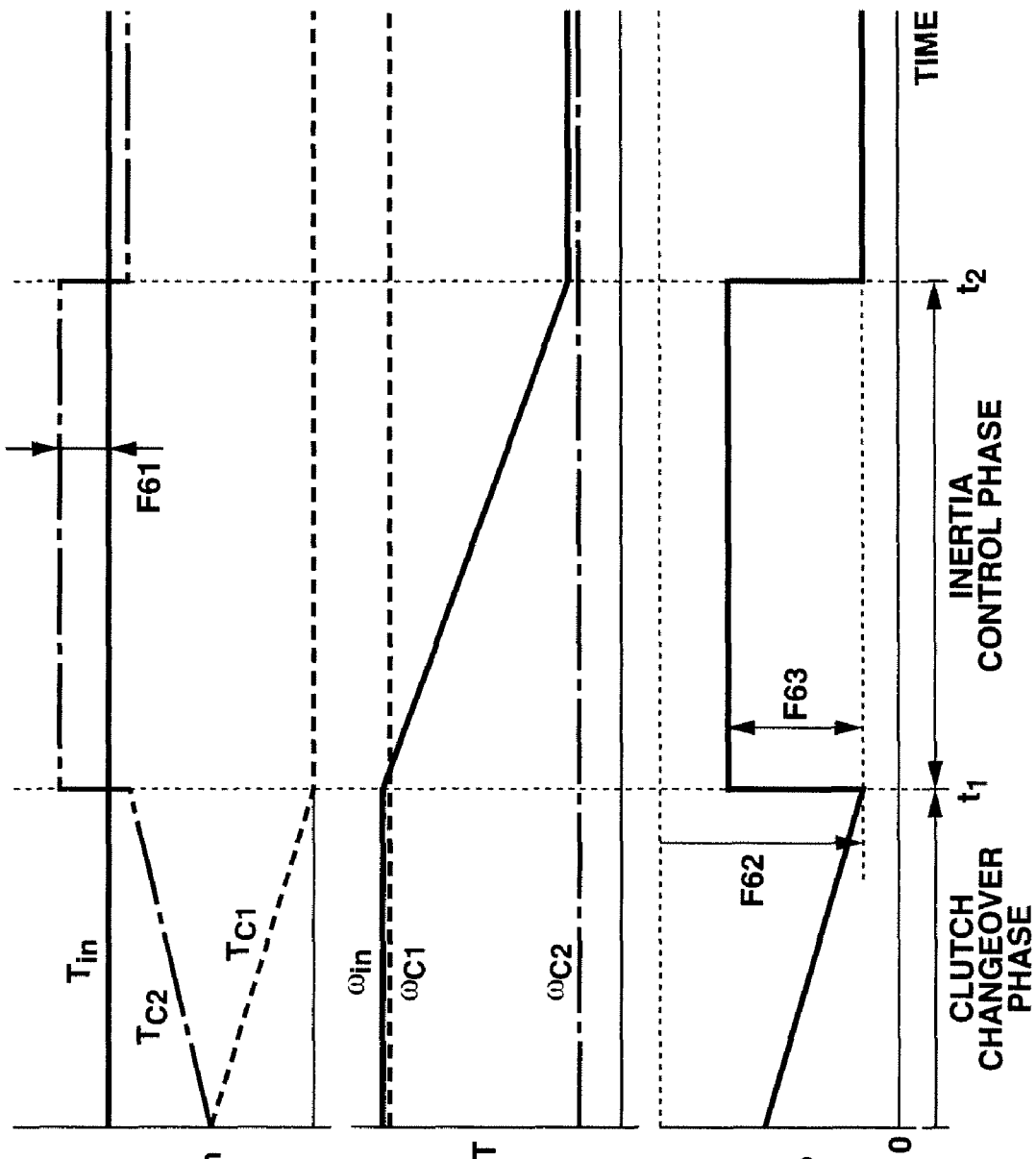
FIGS. 6A, 6B and 6C are time charts showing an example of how an input torque, an input shaft speed, and an output torque of the automatic transmission of FIG. 5 change with time during an upshift.
Figure 7:
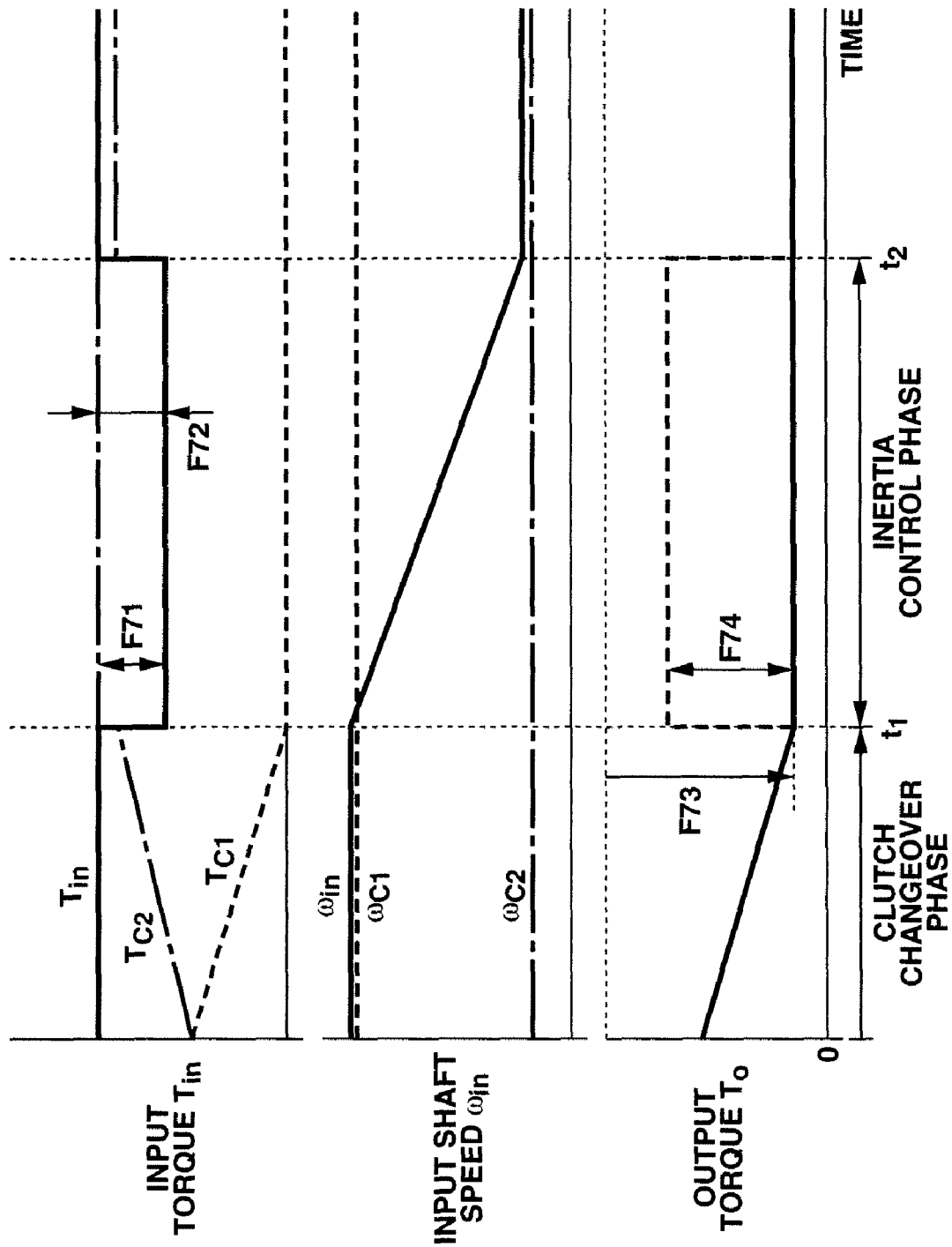
FIGS. 7A, 7B and 7C are time charts showing another example of how the input torque, input shaft speed, and output torque change with time during an upshift.
Figure 8:
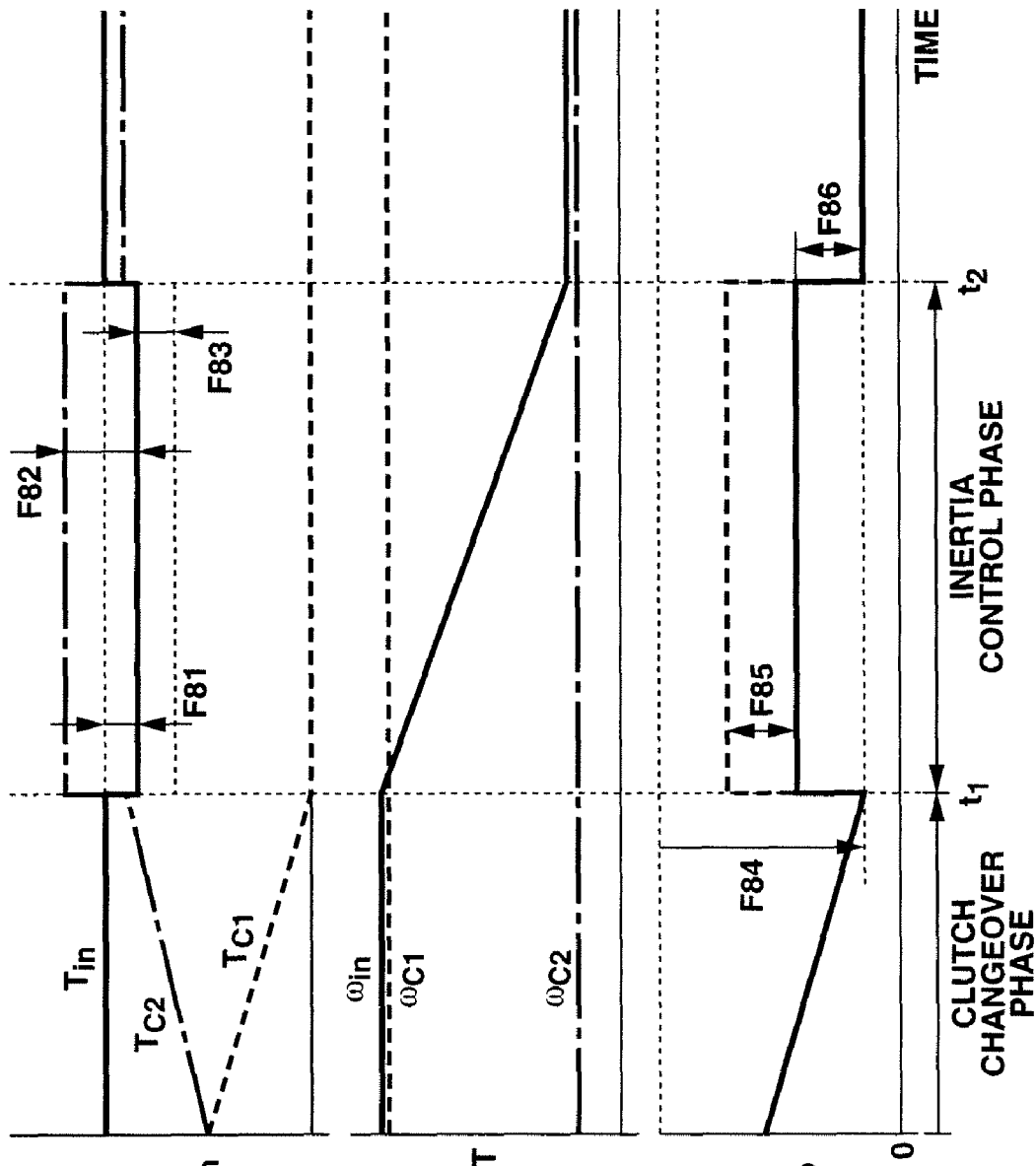
FIGS. 8A, 8B and 8C are time charts showing a further example of how the input torque, input shaft speed, and output torque change with time during an upshift.

The following describes three examples of how an inertia torque resulting from a rotational speed change is absorbed during an upshift in the automatic transmission of FIG. 5 with reference to FIGS. 6A, 6B, 6C, 7A, 7B, 7C, 8A, 8B and 8C. Each of FIGS. 6A, 7A and 8A shows how an input torque $T_{in}$ changes with time, where a solid line represents input torque $T_{in}$, a dashed line represents the torque capacity (or transmitted torque) of the first clutch (to-be-disengaged clutch) $T_{C1}$, and a long dashed short dashed line represents the torque capacity (or transmitted torque) of the second clutch (to-be-engaged clutch) $T_{C2}$. Each of FIGS. 6B, 7B and 8B shows how an input shaft speed $\omega_{in}$ changes with time, where a solid line represents input shaft speed $\omega_{in}$, a dashed line represents the output speed of the first clutch $\omega_{C1}$, a long dashed short dashed line represents the output speed of the second clutch $\omega_{C2}$. Each of FIGS. 6C, 7C and 8C shows how an output torque $T_o$ changes with time. FIGS. 6A to 8C show changes from before a time instant $t_1$ at which the inertia control phase starts. In these examples, the inertia control phase follows the clutch changeover phase.

In the example of FIGS. 6A to 6C, as shown in FIG. 6A, input torque $T_{in}$ is held constant during the upshift with no engine torque reduction control. The inertia control phase starts at time instant $t_1$ and terminates at a time instant $t_2$. Input shaft speed $\omega_{in}$ is reduced generally from first clutch output speed $\omega_{C1}$ to second clutch output speed $\omega_{C2}$ during the inertia control phase, as shown in FIG. 6B. The reduction of input shaft speed $\omega_{in}$ is implemented by increasing the torque capacity of the to-be-engaged clutch $T_{C2}$ and maintaining it constant above the input torque $T_{in}$ as indicated by F61 in FIG. 6A. This excess torque is proportional to the rate of change of input shaft speed $\omega_{in}$ (or proportional to the acceleration of input shaft 35). In other words, the change in input shaft speed $\omega_{in}$ causes an inertia torque, which is identical in magnitude to the excess torque. The inertia torque is transmitted to output shaft 36 as an additional output torque. As shown in FIG. 6C, the output torque $T_0$ decreases gradually due to the difference between the before-shift and after-shift transmission gear ratios during the clutch changeover phase as indicated by F62, and then increases due to the inertia torque during the inertia control phase as indicated by F63. Thus, the output torque $T_0$ contains a toque torque step, causing a shock. When the automatic transmission is applied to a motor vehicle, such a shock adversely affects the ride quality.

In the example of FIGS. 7A to 7C, as shown in FIG. 7A, the input torque $T_{in}$ is reduced by engine torque reduction control as indicated by F71. The reduction of input shaft speed $\omega_{in}$ in the inertia control phase is implemented by setting the torque capacity of the to-be-engaged clutch $T_{C2}$ above the input torque $T_{in}$ as indicated by F72 in FIG. 7A. This excess torque is equal to the reduction in input torque $T_{in}$. Thus, as shown in FIG. 7C, the output torque $T_0$ decreases gradually due to the difference between the before-shift and after-shift transmission gear ratios during the clutch changeover phase as indicated by F73, and then is held constant during the inertia control phase as indicated by F74. In this case, the inertia torque is cancelled by the reduction in input torque $T_{in}$, so that no shock is outputted to output shaft 36.

However, there are situations where it is impossible to cancel the inertia torque by engine torque reduction control as in FIGS. 7A to 7C. The situations include a situation where an upshift is carried out under condition that an accelerator pedal is little depressed or completely released so that no further engine torque reduction is possible because no engine torque is outputted before the upshift. FIGS. 8A to 8C show such a situation. As shown in FIG. 8A, the input torque $T_{in}$ is reduced by engine torque reduction control during the inertia control phase. The reduction in the input torque $T_{in}$ is limited as indicated by F81, although a further reduction is desired as indicated by F83. In order to implement the reduction in input shaft speed $\omega_{in}$, the torque capacity of the to-be-engaged clutch $T_{C2}$ is increased and maintained above the input torque $T_{in}$ as indicated by F82 in FIG. 8A. This excess torque is larger than the decrease in input torque $T_{in}$. Thus, as shown in FIG. 8C, the output torque $T_0$ decreases gradually due to the difference between the before-shift and after-shift transmission gear ratios during the clutch changeover phase as indicated by F84, and then increases during the inertia control phase as indicated by F86, although reduced to some extent by engine torque reduction control as indicated by F85 as compared to the example of FIGS. 6A to 6C. Thus, the output torque $T_0$ contains a torque step, causing a shock.

Figure 9:
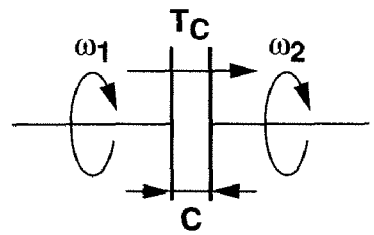
FIG. 9 is a diagram showing a general relationship in a clutch among input speed, output speed, torque capacity and transmitted torque.

The following describes a method of canceling an inertia torque resulting from a gear shift by controlling clutches. FIG. 9 illustrates a general relationship in a clutch among input speed $\omega_1$, output speed $\omega_2$, torque capacity C and transmitted torque $T_C$. The relationship is expressed by equation (A).

$$T_C = C * \text{sign}(\omega_1 - \omega_2) \quad (A)$$

where C represents the torque capacity (=(coefficient of friction)·(apply force)), and sign(x) represents a sign operator indicative of the sign of the variable x.

According to equation (A), the direction of the transmitted torque depends on the relationship between input shaft speed $\omega_1$ and output shaft speed $\omega_2$.

Figure 10:
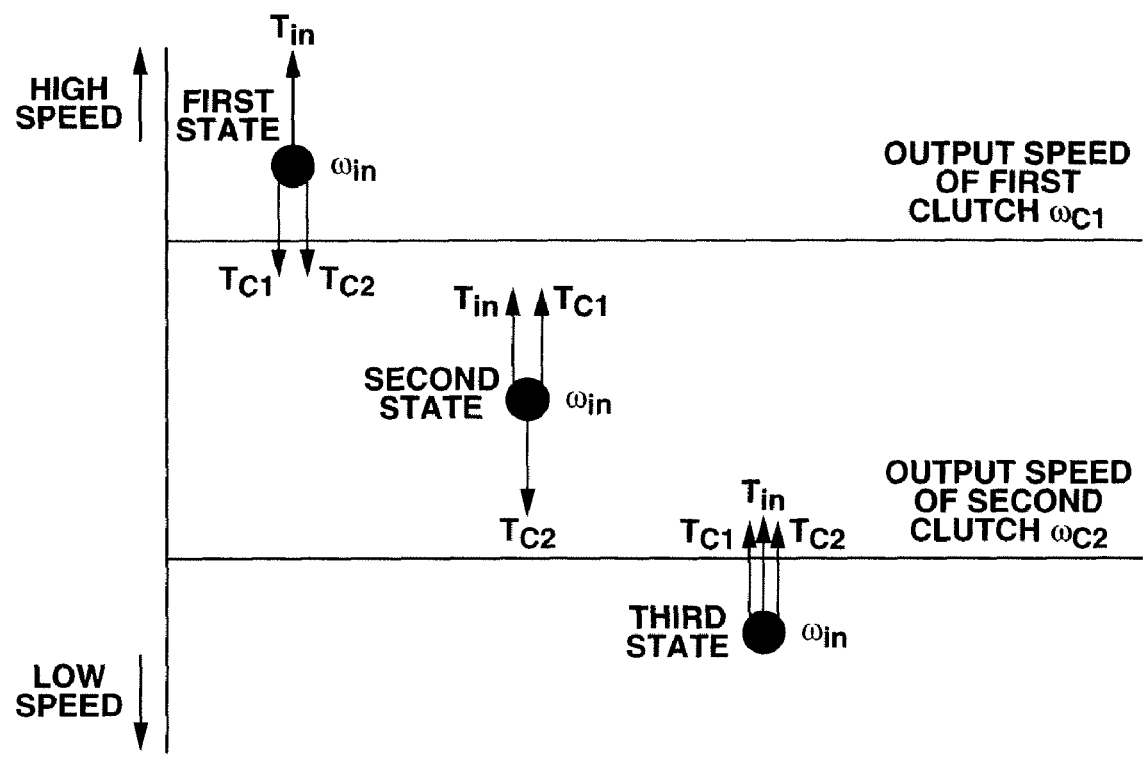
FIG. 10 is a diagram showing how clutch engagement serves to change the input shaft speed in three different states of the relationship among the input shaft speed, the output speed of a first clutch, and the output speed of a second clutch in the automatic transmission of FIG. 5.

Equation (A) is applied to the two-speed transmission shown in FIG. 5. FIG. 10 illustrates how clutch engagement serves to change input shaft speed $\omega_{in}$ in three different states of the relationship among input shaft speed $\omega_{in}$, first clutch output speed $\omega_{C1}$, and second clutch the output speed $\omega_{C2}$ in the automatic transmission of FIG. 5. Input shaft 35 is subject to input torque $T_{in}$, clutch torque $T_{C1}$ and clutch torque $T_{C2}$.

FIG. 10 shows a first state of the transmission where input shaft speed $\omega_{in}$ is higher than both of first clutch output speed $\omega_{C1}$ and second clutch output speed $\omega_{C2}$. In the first state, both of the clutch torques $T_{C1}$ and $T_{C2}$ act in the opposite direction to input torque $T_{in}$ so as to reduce the input shaft speed $\omega_{in}$. Accordingly, the input shaft speed $\omega_{in}$ decreases, when both of first and second clutches 33 and 34 are in respective sliding engaged states.

FIG. 10 also shows a second state of the transmission where input shaft speed $\omega_{in}$ is higher than second clutch output speed $\omega_{C2}$, and lower than first clutch output speed $\omega_{C1}$. In the second state, the clutch torque $T_{C1}$ acts in the same direction as input torque $T_{in}$ so as to increase the input shaft speed $\omega_{in}$, while the clutch torque $T_{C2}$ acts in the opposite direction to input torque $T_{in}$ so as to reduce the input shaft speed $\omega_{in}$. Accordingly, the input shaft speed $\omega_{in}$ does not always decrease, when the first and second clutches 33 and 34 are in respective sliding engaged states.

FIG. 10 further shows a third state of the transmission where the input shaft speed $\omega_{in}$ is lower than both of first clutch output speed $\omega_{C1}$ and second clutch output speed $\omega_{C2}$. In the third state, both of the clutch torques $T_{C1}$ and $T_{C2}$ act in the same direction as input torque $T_{in}$ so as to increase the input shaft speed $\omega_{in}$.

The following concerns the foregoing second state of the transmission, and describes how to determine the clutch torque capacities in balance so as to cancel the inertia torque due to change in the input shaft speed, and to prevent fluctuations in the output torque.

With regard to the two-speed transmission shown in FIG. 5, an equation of motion as to input shaft 35 is expressed by equation (1), while an equation of motion as to output shaft 36 is expressed by equation (2).

$$T_{in}=T_{c1}+T_{c2}+I_{in}\dot{\omega}_{in} \quad (1)$$

$$T_0=r_1(T_{c1}-I_{C1}\dot{\omega}_{C1})+r_2(T_{c2}-I_{C2}\dot{\omega}_{C2}) \quad (2)$$

where $T_{in}$: an input torque to input shaft 35,
$T_{C1}$: a transmitted torque of first clutch 33,
$T_{C2}$: a transmitted torque of second clutch 34,
$I_{in}$: the moment of inertia of input shaft 35,
$\omega_{in}$: the rotational speed of input shaft 35,
$T_0$: an output torque to output shaft 36,
$r_1$: a transmission gear ratio through a power path with first clutch 33,
$r_2$: a transmission gear ratio through a power path with second clutch 34,
$I_{C1}$: the moment of inertia of the power path with first clutch 33,
$I_{C2}$: the moment of inertia of the power path with second clutch 34,
$\dot{\omega}_{C1}$: the rate of change of the output speed of first clutch 33, and
$\dot{\omega}_{C2}$: the rate of change of the output speed of second clutch 34.

Applying the equation (A) to each of first and second clutches 33 and 34 gives equation (3).

$$T_{C1}=C_1 \times \text{sign}(\omega_{in}-\omega_{C1})$$

$$T_{C2}=C_2 \times \text{sign}(\omega_{in}-\omega_{C2}) \quad (3)$$

where $C_1$: the torque capacity of first clutch 33,
$C_2$: the torque capacity of second clutch 34,
$\omega_{in}$: the rotational speed of input shaft 35,
$\omega_{C1}$: the output speed of first clutch 33,
$\omega_{C2}$: the output speed of second clutch 34, and
sign: the sign operator.

It is assumed that first clutch 33 is a to-be-disengaged clutch and second clutch 34 is a to-be-engaged clutch in an upshift of the transmission. When the transmission is in the second state, the relationship of $\omega_{C1}>\omega_{in}>\omega_{C2}$ holds. Substituting this relationship into equation (3) yields equation (4).

$$T_{C1}=-C_1, T_{C2}=C_2 \quad (4)$$

The following concerns an under-acceleration upshift as an upshift which is carried out while the vehicle speed is increasing. In such an under-acceleration upshift, disengagement of the to-be-disengaged clutch allows input shaft speed $\omega_{in}$ to be increased by input torque $T_{in}$, while the upshift requires a decrease in input shaft speed $\omega_{in}$. Accordingly, this upshift is implemented by a prior clutch changeover phase, and a subsequent inertia control phase where the torque capacity of the to-be-engaged clutch is dominant. Input torque $T_{in}$ is usually positive. In view of the foregoing, the clutch torque capacities just prior to the inertia control phase are expressed by equation (5). When a torque capacity correction of the first clutch $\Delta C_1$ and a torque capacity correction of the second clutch $\Delta C_2$ are provided in the inertia control phase, the clutch torque capacities are expressed by equation (6).

$$C_1 C = 0$$

$$C_2 = C_{20} = |T_{in}| \quad (5)$$

$$C_1 = C_{10} + \Delta C_1 = \Delta C_1$$

$$C_2 = C_{20} + \Delta C_2 = |T_{in}| + \Delta C_2 \quad (6)$$

where $C_{10}$: the torque capacity of first clutch 33 just prior to the start of the inertia control phase, and $C_{20}$: the torque capacity of second clutch 34 just prior to the start of the inertia control phase.

Substituting the equation (6) into the equation (1) yields equation (7). Assuming $T_{in}>0$ gives $T_{in}=|T_{in}|$. Substituting this into the equation (7) yields the equation (8).

$$T_{in}=-\Delta C_1+|T_{in}|+\Delta C_2+I_{in}\dot{\omega}_{in} \quad (7)$$

$$I_{in}\dot{\omega}_{in}=\Delta C_1-\Delta C_2 \quad (8)$$

Substituting the equation (6) into the equation (2) yields the equation (9). In order to cause no change in output torque $T_o$, and output shaft speed $\omega_{out}$ by first and second clutch torque capacity corrections $\Delta C_1$ and $\Delta C_2$, the equation (10) is required. The equation (10) is reduced to the equation (11).

$$T_0 = -r_1\Delta C_1 + r_2(|T_{in}| + \Delta C_2) - r_1^2 I_{c1}\dot{\omega}_{c1} - r_2^2 I_{c2}\dot{\omega}_{c2} \quad (9)$$

$$-r_1\Delta C_1 + r_2\Delta C_2 = 0 \quad (10)$$

$$\Delta C_1 = \frac{r_2}{r_1}\Delta C_2 \quad (11)$$

Substituting the equation (8) into the equation (11) yields the equation (12). The equations (11) and (12) are reduced to the equation (13) where $\Delta C_1$ and $\Delta C_2$ are related to the inertia torque $I_{in}\dot{\omega}_{in}$.

$$I_{in}\dot{\omega}_{in} = \frac{r_2}{r_1}\Delta C_2 - \Delta C_2 \quad (12)$$

$$\Delta C_1 = \frac{r_2}{r_2 - r_1} I_{in}\dot{\omega}_{in} \quad (13)$$

$$\Delta C_2 = \frac{r_1}{r_2 - r_1} I_{in}\dot{\omega}_{in}$$

The following concerns an under-deceleration upshift as an upshift which is carried out while the accelerator pedal is released after the accelerator pedal is depressed to downshift the transmission. In such an under-deceleration upshift, disengagement of the to-be-disengaged clutch allows input shaft speed $\omega_{in}$ to be reduced by input torque $T_{in}$ which is negative, while the upshift requires a decrease in input shaft speed $\omega_{in}$. Accordingly, this upshift is implemented by a prior inertia control phase where the torque capacity of the to-be-disengaged clutch is dominant, and a subsequent clutch changeover phase. Input torque $T_{in}$ is usually negative. In view of the foregoing, the clutch torque capacities just prior to the inertia control phase are expressed by equation (14). When a torque capacity correction of the first clutch $\Delta C_1$ and a torque capacity correction of the second clutch $\Delta C_2$ are provided in the inertia control phase, the clutch torque capacities are expressed by equation (15).

$$C_1 = C_{10} = |T_{in}|$$

$$C_2 = C_{20} = 0 \quad (14)$$

$$C_1 = C_{10} + \Delta C_1 |T_{in}| + \Delta C_1$$

$$C_2 = C_{20} + \Delta C_2 = \Delta C_2 \quad (15)$$

Substituting the equation (15) into the equation (1) yields the equation (16). Assuming $T_{in} < 0$ gives $T_{in} = -|T_{in}|$. Substituting this into the equation (16) yields the equation (17).

$$T_{in} = -\Delta C_1 - |T_{in}| + \Delta C_2 + I_{in}\dot{\omega}_{in} \quad (16)$$

$$I_{in}\dot{\omega}_{in} = \Delta C_1 - \Delta C_2 \quad (17)$$

The equation (17) is the same as the equation (8). Therefore, the equations (8) to (13) holds also in the case of under-deceleration upshift, when the clutch changeover phase follows the inertia control phase as contrasted to the case of under-acceleration upshift. The above equations (especially, equation (13)) serve to compute a desired torque capacity correction of the first clutch for inertia torque cancellation $\Delta C_1$ and a desired torque capacity correction of the first clutch for inertia torque cancellation $\Delta C_2$ on the basis of the desired clutch-based torque reduction. The first and second clutches 33 and 34 are controlled to achieve these desired corrections so as to cancel an allocated portion of the inertia torque.

Figure 1:
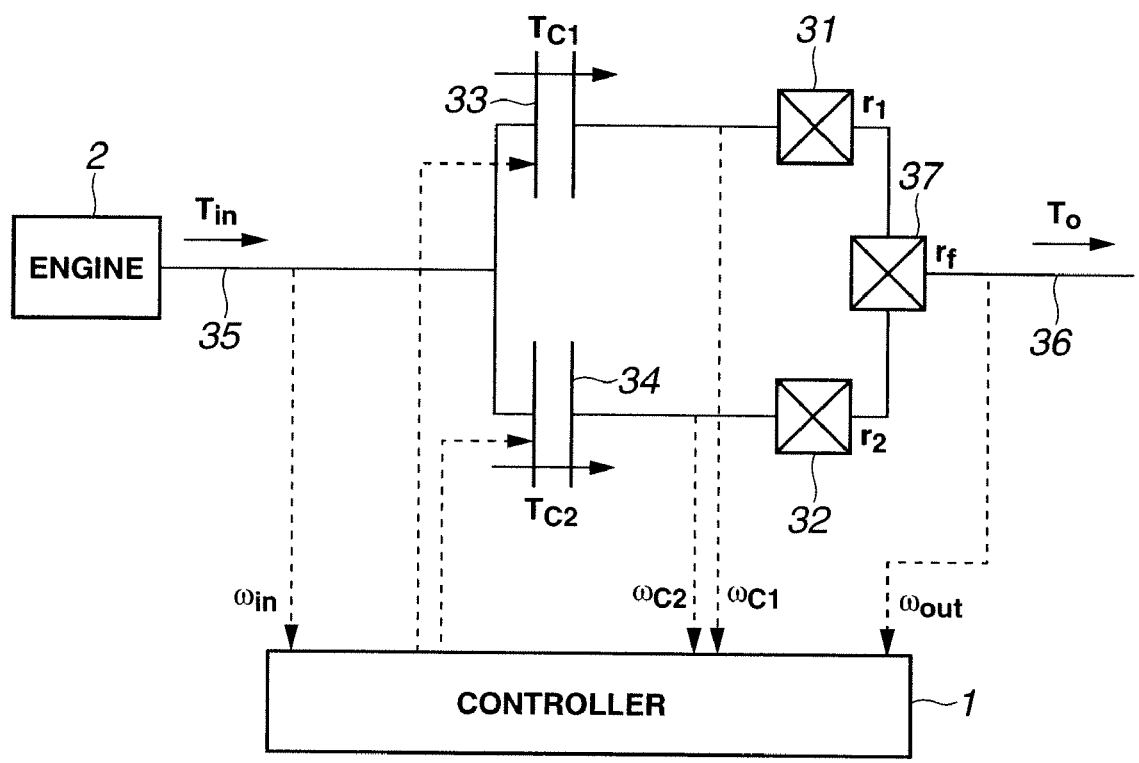
FIG. 1 is a schematic diagram showing an automatic transmission with a shift control apparatus in accordance with embodiments of the present invention.

FIG. 1 schematically shows an automatic transmission with a shift control apparatus in accordance with embodiments of the present invention. The shift control apparatus comprises a controller (inertia torque distribution section) 1 for controlling gear shifts of the automatic transmission. Controller 1 controls an engine 2 as an external drive unit, and the first and second clutches so as to cancel an inertia torque resulting from a change in a rotational state of the automatic transmission (absorb a positive inertia torque or compensate for a negative inertia torque). The controller is an electrical control unit (ECU).

As shown in the equation (13), the desired torque capacity correction of each clutch is a product of the inertia torque $I_{in}\dot{\omega}_{C1}$ and a gain (coefficient) expressed in terms of the transmission gear ratios $r_1$ and $r_2$ which are established by engaging respective clutches. The coefficient is expressed as a fraction having a denominator of the difference between the transmission gear ratios $(r_2 - r_1)$. Accordingly, as the term of $(r_2 - r_1)$ decreases, the coefficient increases so as to increase the desired torque capacity corrections. In the case of a typical transmission having a stepwise transmission gear ratio set, the term of $(r_2 - r_1)$ for an upshift between lower gears, such as from first gear to second gear or from second gear to third gear, is larger than an upshift between higher gears. Therefore, it is appropriate to control the desired torque capacity correction of each clutch within an allowable range in the case of an upshift between higher gears.

When the desired torque capacity corrections are achieved, the first and second clutches 33 and 34 are controlled toward respective engaged states in parallel so as to cancel (absorb, for upshifts) an inertia torque resulting from an upshift. In other words, the inertia torque is absorbed by controlling the first and second clutches 33 and 34 into a state close to an interlock state so that the kinetic energy of the moment of inertia is converted into a thermal energy through friction. Accordingly, it is desired to suppress the desired torque capacity corrections as small as possible.

Moreover, it is desired to suppress increasingly a load to the engine in canceling the inertia torque as the vehicle speed increases, because the output torque of the engine is small under such conditions. From this viewpoint, the shift control apparatus allows the desired torque capacity corrections to increase with increasing vehicle speed, and suppresses the desired torque capacity corrections when the vehicle speed is low.

Figure 11:
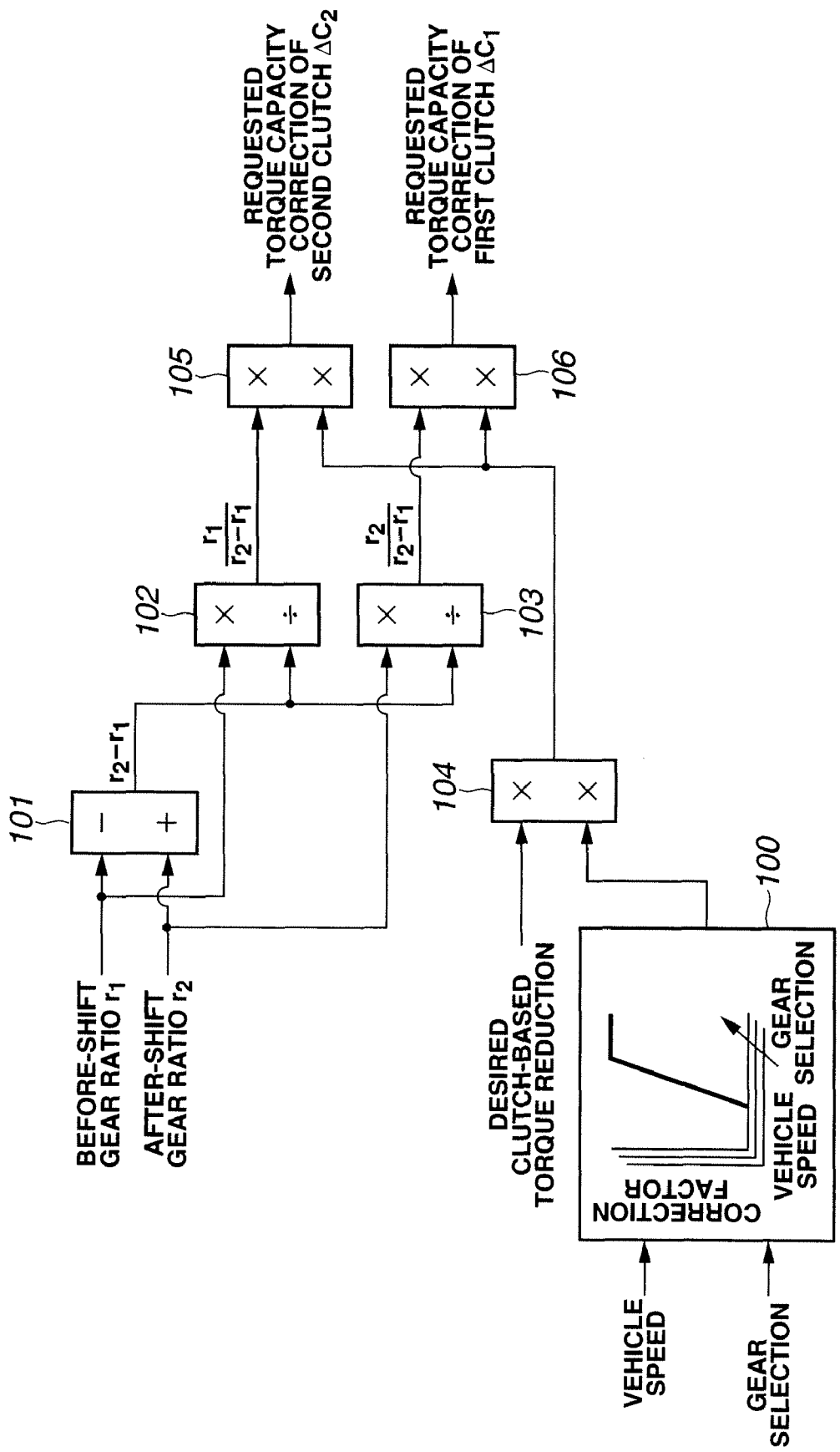
FIG. 11 is a block diagram showing a section of the shift control apparatus of FIG. 1 for computing a desired torque capacity correction of each of first and second clutches for torque down in accordance with a first embodiment of the present invention.

The following describes a shift control apparatus for controlling clutches so as to cancel the inertia torque in accordance with a first embodiment of the present invention with reference to FIGS. 11 to 15C. FIG. 11 shows a section of the shift control apparatus for computing a desired torque capacity correction of each of first and second clutches 33 and 34 for inertia torque cancellation.

As shown in FIG. 11, first, a calculator 101 computes or calculates a difference $(r_2 - r_1)$ on the basis of the before-shift transmission gear ratio $r_1$ and the after-shift transmission gear ratio $r_2$. A calculator 102 calculates a gain for second clutch 34 by dividing the before-shift transmission gear ratio $r_1$ by the difference $(r_2 - r_1)$. A calculator 103 calculates a gain for first clutch 33 by dividing the after-shift transmission gear ratio $r_2$ by the difference $(r_2 - r_1)$. A calculator 104 calculates a corrected desired clutch-based torque reduction on the basis of a desired clutch-based torque reduction and a correction factor for suppressing it. Specifically, calculator 104 corrects the desired clutch-based torque reduction by multiplying the correction factor. The correction factor is stored in a map section 100. The correction factor is determined based on the vehicle speed of a motor vehicle and gear selection. Specifically, the correction factor is equal to zero when the vehicle speed is low, starts to increase when the vehicle speed is middle, increases as the vehicle speed increases, and is equal to a maximum value of 1 when the vehicle speed is high. Such characteristics are prepared in the form of a map for each gear. The lines defining the correction factor are shifted in the positive direction of the axis of the vehicle speed in the map, as the selected gear becomes higher. Thus, the desired clutch-based torque reduction is increasingly suppressed with decreasing vehicle speed, and increasingly suppressed as the elected gear becomes high.

A calculator 105 calculates a desired torque capacity correction of the second clutch $\Delta C_2$ by multiplying the desired clutch-based torque reduction corrected by the calculator 104 and the gain calculated by the calculator 102. Similarly, a calculator 106 calculates a desired torque capacity correction of the first clutch $\Delta C_1$ by multiplying the desired clutch-based torque reduction corrected by the calculator 104 and the gain calculated by the calculator 103. Thus, the desired torque capacity corrections $\Delta C_1$ and $\Delta C_2$ are increasingly suppressed with decreasing vehicle speed, and increasingly suppressed as the elected gear becomes high.

According to the above calculation of the desired torque capacity corrections in consideration of the correction factor, it is possible to control the desired engine-based torque reduction and desired clutch-based torque reduction in balance, and to prevent the desired torque capacity corrections from increasing excessively, depending on the vehicle speed.

Figure 12:
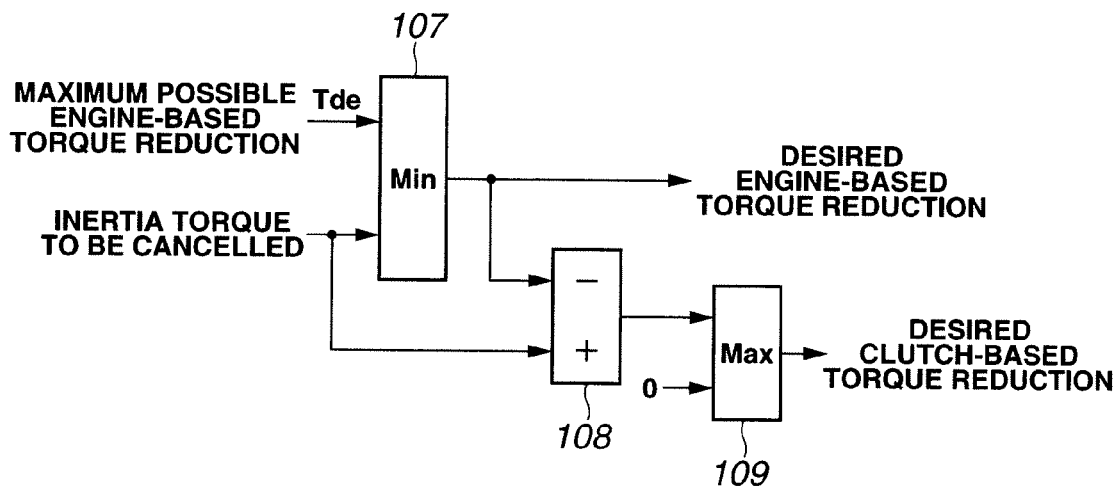
FIG. 12 is a block diagram showing a section of the shift control apparatus of FIG. 1 for computing a desired engine-based torque reduction and a desired clutch-based torque reduction for inertia torque cancellation in accordance with the first embodiment.

FIG. 12 shows a section of the shift control apparatus for computing a desired engine-based torque reduction and a desired clutch-based torque reduction for inertia torque cancellation, on the basis of an inertia torque to be cancelled. In general, an engine-based torque reduction is restricted within an upper bound so as to allow the engine to continue to rotate. This upper bound is calculated on the basis of parameters such as engine speed, output torque, combustion mode (lean combustion mode, theoretical air fuel ratio combustion mode, etc.), the number of active cylinders, ignition timing, coolant temperature, and the operating state of auxiliary equipment attached to the engine. A comparator 107 compares the to-be-cancelled inertia torque with the maximum possible engine-based torque reduction $T_{de}$, and outputs the smaller one of the two as a desired engine-based torque reduction. A calculator 108 calculates a desired clutch-based torque reduction by subtracting the to-be-cancelled inertia torque by the desired engine-based torque reduction. A comparator 109 compares the desired clutch-based torque reduction with zero, and outputs the larger one of the two as a final desired clutch-based torque reduction. This is because the clutches can attain no negative torque capacity.

Figure 13:
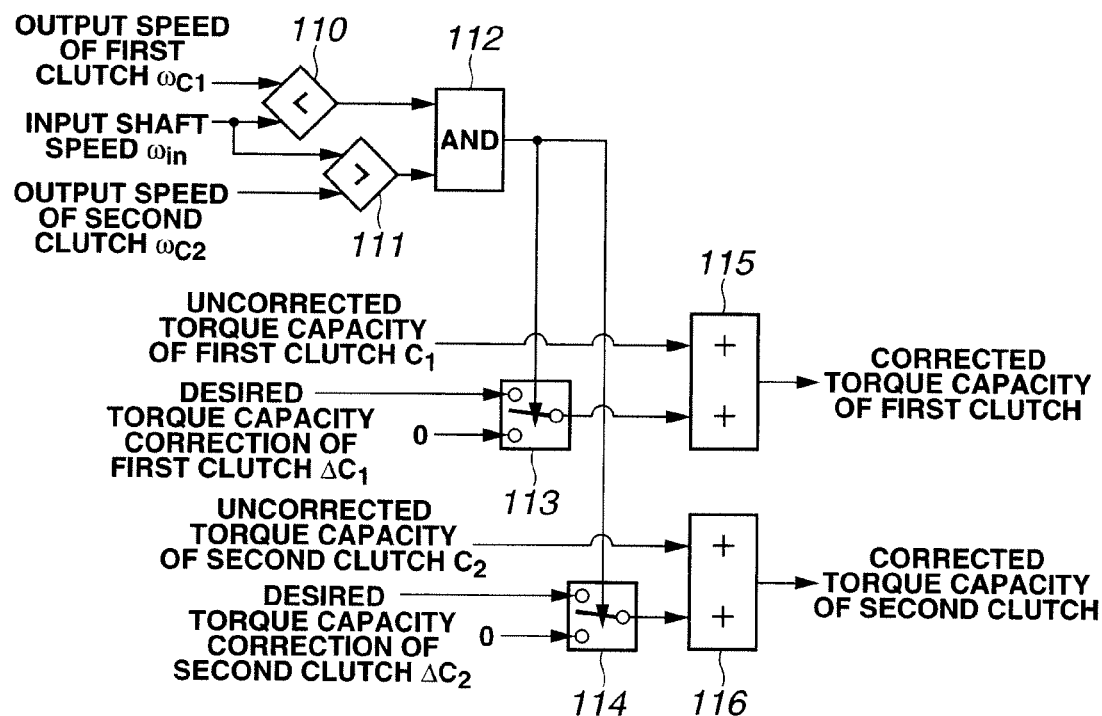
FIG. 13 is a block diagram showing a section of the shift control apparatus of FIG. 1 for computing a corrected torque capacity of each of the first and second clutches in accordance with the first embodiment.

Thus, the desired torque capacity correction of each clutch is calculated from the to-be-cancelled inertia torque according to the processes shown in FIGS. 11 and 12. FIG. 13 shows a section of the shift control apparatus for computing a corrected torque capacity of each of the first and second clutches for inertia torque cancellation. In FIG. 13, the corrected torque capacity of each clutch is calculated by adding an uncorrected torque capacity and the desired torque capacity correction. The uncorrected torque capacity is a torque capacity required to implement the gear shift without consideration of the inertia torque. The corrected torque capacity of each clutch is achieved by supplying a corresponding clutch engagement pressure to the clutch.

The uncorrected torque capacity of each clutch is given so that the input shaft speed $\omega_{in}$ decreases linearly. This is implemented by setting the uncorrected torque capacity so that the differential speed $(\omega_{C1}-\omega_{in})$ increases linearly or the differential speed $(\omega_{in}-\omega_{C2})$ decreases linearly. The foregoing calculation of the corrected torque capacity of each clutch is carried out when the relationship of $\omega_{C1}>\omega_{in}>\omega_{C2}$ holds. As shown in FIG. 13, only when a comparator 110 determines that first clutch output speed $\omega_{C1}$ is higher than input shaft speed $\omega_{in}$, a comparator 111 determines that input shaft speed $\omega_{in}$ is higher than second clutch output speed $\omega_{C2}$, and a logic section 112 determines that the relationship of $\omega_{C1}>\omega_{in}>\omega_{C2}$ holds, addition-permitting switches 113 and 114 allow an adder 115 to calculate the corrected torque capacity of first clutch 33, and allow an adder 116 to calculate the corrected torque capacity of second clutch 34.

Figure 14:
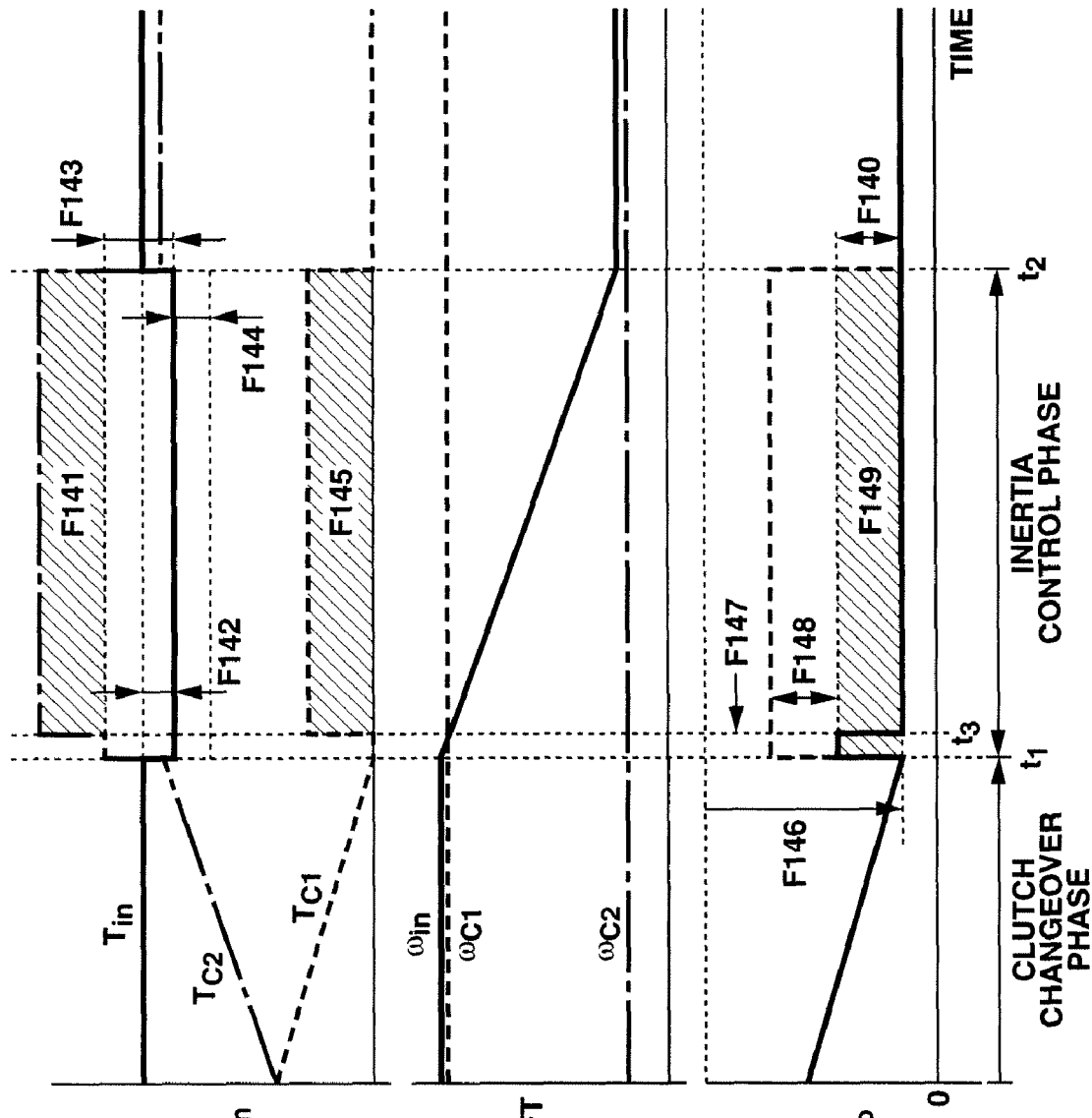
FIGS. 14A, 14B and 14C are time charts showing an example of how the input torque, input shaft speed and output torque change with time under control during an upshift in accordance with the first embodiment.
Figure 15:
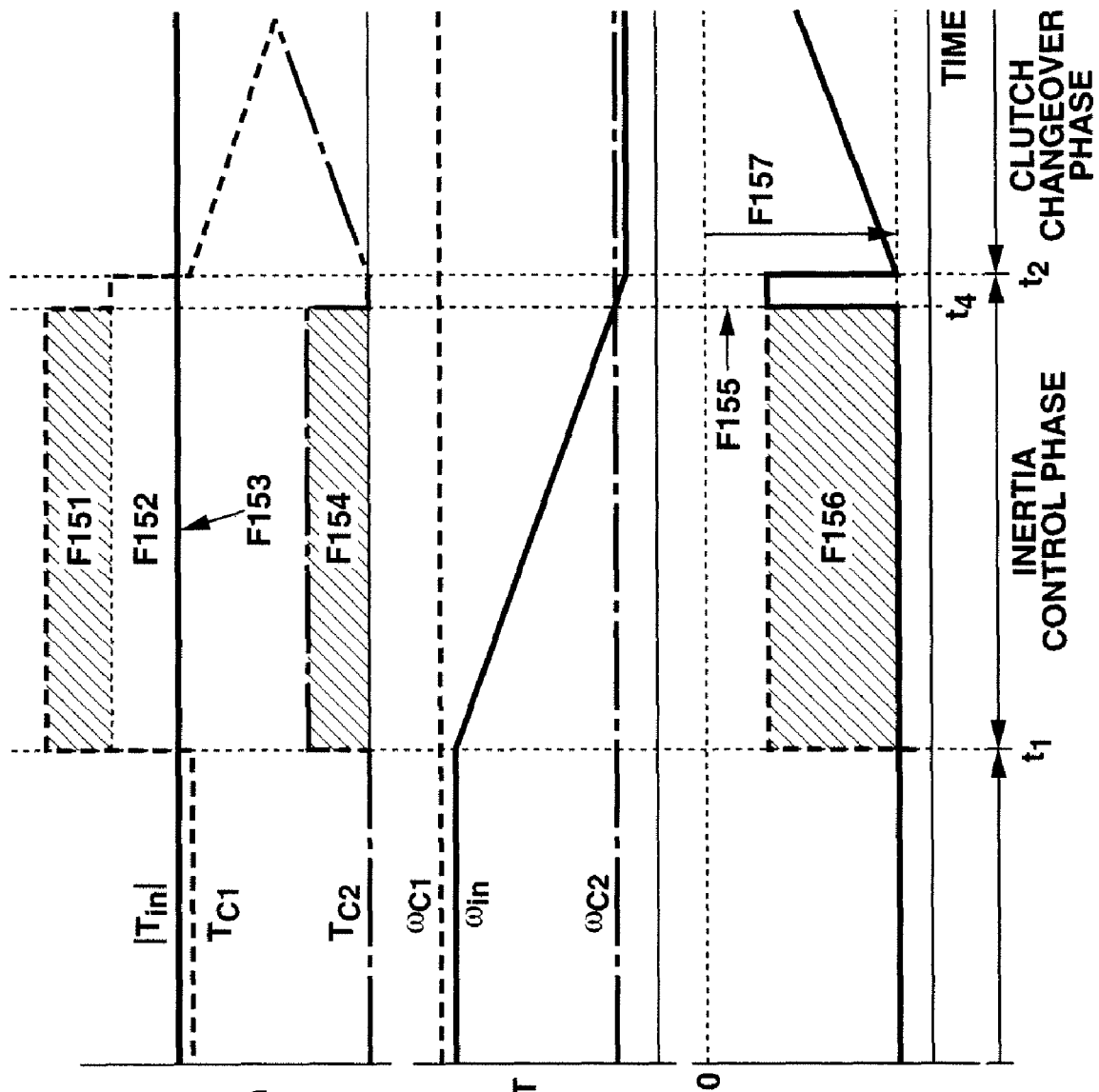
FIGS. 15A, 15B and 15C are time charts showing another example of how the input torque, input shaft speed and output torque change with time under control during an upshift in accordance with the first embodiment.

The thus-constructed shift control apparatus operates to cancel an inertia torque during an upshift of the automatic transmission as follows. Each of FIGS. 14A and 15A shows how the input torque $T_{in}$ changes with time, where a solid line represents the input torque $T_{in}$ a dashed line represents the torque capacity (or transmitted torque) of the first clutch (to-be-disengaged clutch) $T_{C1}$, and a long dashed short dashed line represents the torque capacity (or transmitted torque) of the second clutch (to-be-engaged clutch) $T_{C2}$. Each of FIGS. 14B and 15B shows how the input shaft speed $\omega_{in}$ changes with time, where a solid line represents the input shaft speed $\omega_{in}$, a dashed line represents the output speed of the first clutch $\omega_{C1}$, a long dashed short dashed line represents the output speed of the second clutch $\omega_{C2}$. Each of FIGS. 14C and 15C shows how the output torque $T_o$ changes with time. FIGS. 14A to 15C show changes from before the time instant $t_1$ at which the inertia control phase starts.

In the example of FIGS. 14A to 14C, an under-acceleration upshift is implemented by a prior clutch changeover phase and a subsequent inertia control phase. As shown in FIG. 14A, input torque $T_{in}$ is reduced by engine torque reduction control during the inertia control phase. The reduction in the input torque $T_{in}$ is limited as indicated by F142, although a further reduction is desired as indicated by F144. A time instant $t_3$ is when the input shaft speed $\omega_{in}$ decreases below the first clutch output speed $\omega_{C1}$. In order to implement the speed reduction of input shaft speed $\omega_{in}$, the torque capacity of the to-be-engaged clutch $T_{C2}$ is increased and maintained above the input torque $T_{in}$ as indicated by F143. The torque capacity of the to-be-disengaged clutch $T_{C1}$ and to-be-engaged clutch $T_{C2}$ are further increased as indicated by hatched patterns of F141 and F145. As shown in FIG. 14C, the output torque $T_o$ decreases gradually due to the difference between the before-shift and after-shift transmission gear ratios during the clutch changeover phase as indicated by F146, and then is held constant except an instantaneous increase over a time interval from time instant $t_1$ to time instant $t_3$. This time interval exists because the clutch-based torque reduction is impossible while the first clutch output speed $\omega_{C1}$ is lower than the input shaft speed $\omega_{in}$ as indicated by F147. Thus, the engine-based torque reduction serves to cancel a portion of the output torque $T_o$ as indicated by F148, while the clutch-based torque reduction serves to cancel another portion of the output torque $T_o$, which cannot be cancelled by the engine as indicated by F149, as indicated by F140.

In the example of FIGS. 15A to 15C, an under-deceleration upshift is implemented by a prior inertia control phase and a subsequent clutch changeover phase. During such an under-deceleration upshift, the engine torque is usually minimum. Accordingly, there is no available engine-based torque reduction. If the engine torque is negative, canceling the inertia torque requires an increase in the engine torque, for example, by terminating a fuel cut. This may effect adversely other functions of the engine. Even in such cases, it is possible to cancel all of the inertia torque resulting from change in the rotational state by controlling the torque capacity of the first and second clutches 33 and 34 with no engine-based torque reduction as follows. As shown in FIG. 15A, the absolute value of input torque $|T_{in}|$ is held constant during the upshift as indicated by F153. A time instant $t_4$ is when the input shaft speed $\omega_{in}$ decreases below the second clutch output speed $\omega_{C2}$. In order to implement the speed reduction of input shaft speed $\omega_{in}$, the torque capacity of the to-be-engaged clutch $T_{C2}$ is increased and maintained above the input torque $T_{in}$ as indicated by F152. The torque capacity of the to-be-disengaged clutch $T_{C1}$ and to-be-engaged clutch $T_{C2}$ are further increased as indicated by hatched patterns of F151 and F154. As shown in FIG. 15C, the output torque $T_o$ is held constant during the inertia control phase except an instantaneous increase (decrease in magnitude) over a time interval from time instant $t_4$ to time instant $t_2$ as indicated by F156, and then decreases in magnitude due to the difference between the before-shift and after-shift transmission gear ratios during the clutch changeover phase as indicated by F157. This time interval exists because the clutch-based torque reduction is impossible while the input shaft speed $\omega_{in}$ is lower than the second clutch output speed $\omega_{C2}$ as indicated by F155. Thus, the clutch-based torque reduction serves to cancel almost all of the output torque $T_o$ as indicated by F156.

The following describes a shift control apparatus for controlling clutches so as to cancel the inertia torque in accordance with a second embodiment of the present invention with reference to FIGS. 16 to 20C. In the first embodiment, it is possible that the inertia torque is insufficiently cancelled to cause an increase in the output torque $T_o$ when the relationship of first clutch output speed $\omega_{C1}>$input shaft speed $\omega_{in}>$second clutch output speed $\omega_{C2}$ does not hold. The second embodiment concerns a solution to this problem. Specifically, in the second embodiment, input shaft speed $\omega_{in}$ is controlled to change with such a dynamic characteristic that the rate of change of input shaft speed $\omega_{in}$ is small at the start and end of the change as shown in FIGS. 19B and 20B, in contrast to the first embodiment where the input shaft speed changes linearly.

More specifically, the shift control apparatus of the second embodiment sets a target input shaft speed $\omega_{in}$* as indicated by a dashed line in FIGS. 19B and 20B which decreases along a curved line; sets the uncorrected desired torque capacity of each clutch so that input shaft speed $\omega_{in}$ follows target input shaft speed $\omega_{in}$*; sets the torque capacity correction of each clutch so as to cancel an inertia torque resulting from change in target input shaft speed $\omega_{in}*$; sets the corrected desired torque capacity of each clutch by adding the uncorrected desired torque capacity and torque capacity correction; and controls the first and second clutches 33 and 34 to attain the corrected desired torque capacity.

Although input shaft speed $\omega_{in}$ is directly controlled in the foregoing description, the difference in first clutch 33 between the input and output speeds ($\omega_{C1}-\omega_{in}$) or the difference in second clutch 34 between the input and output speeds ($\omega_{in}-\omega_{C2}$) may be controlled. In such cases, the torque capacity of each clutch is controlled so that such differential speed changes (increases or decreases) along a curved line.

Figure 16:
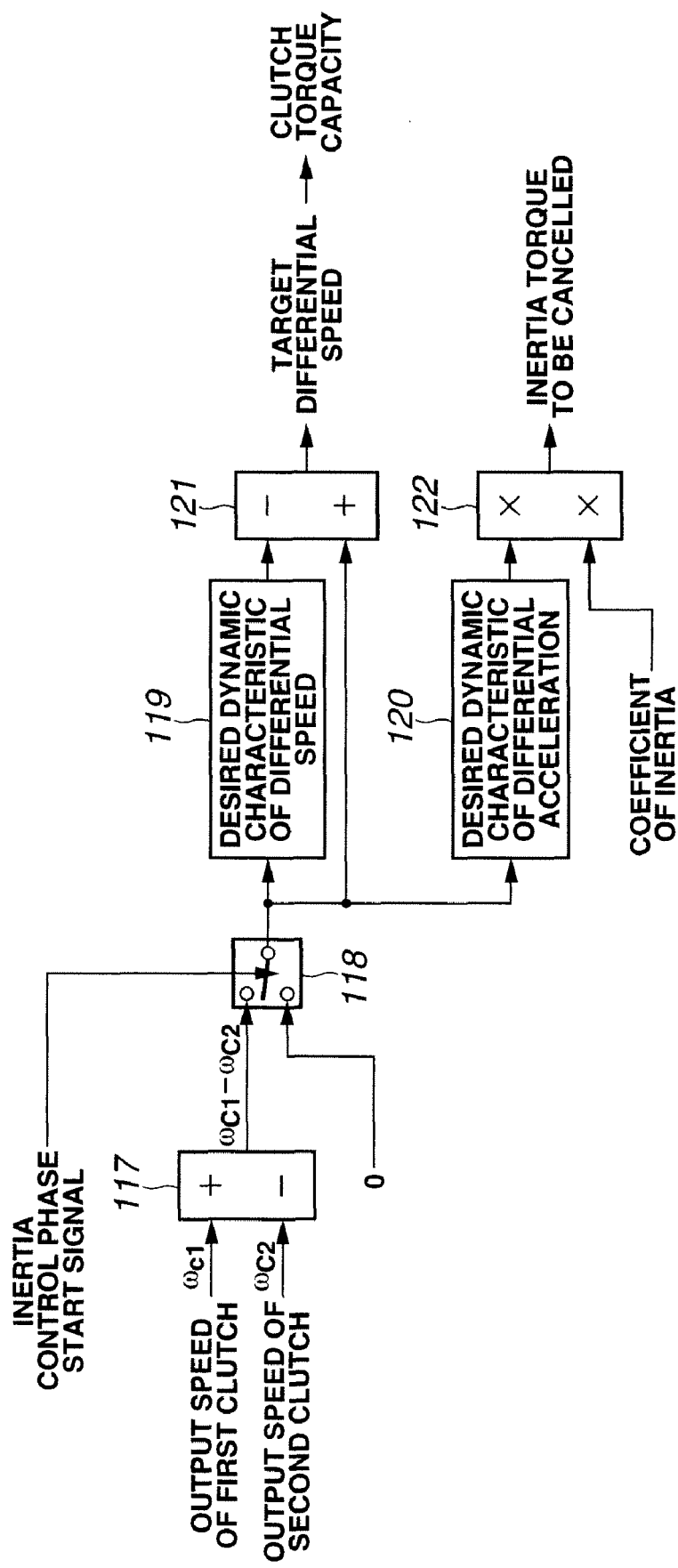
FIG. 16 is a block diagram showing a section of the shift control apparatus of FIG. 1 for computing a target differential speed with a desired dynamic characteristic in accordance with a second embodiment of the present invention.
Figure 17:
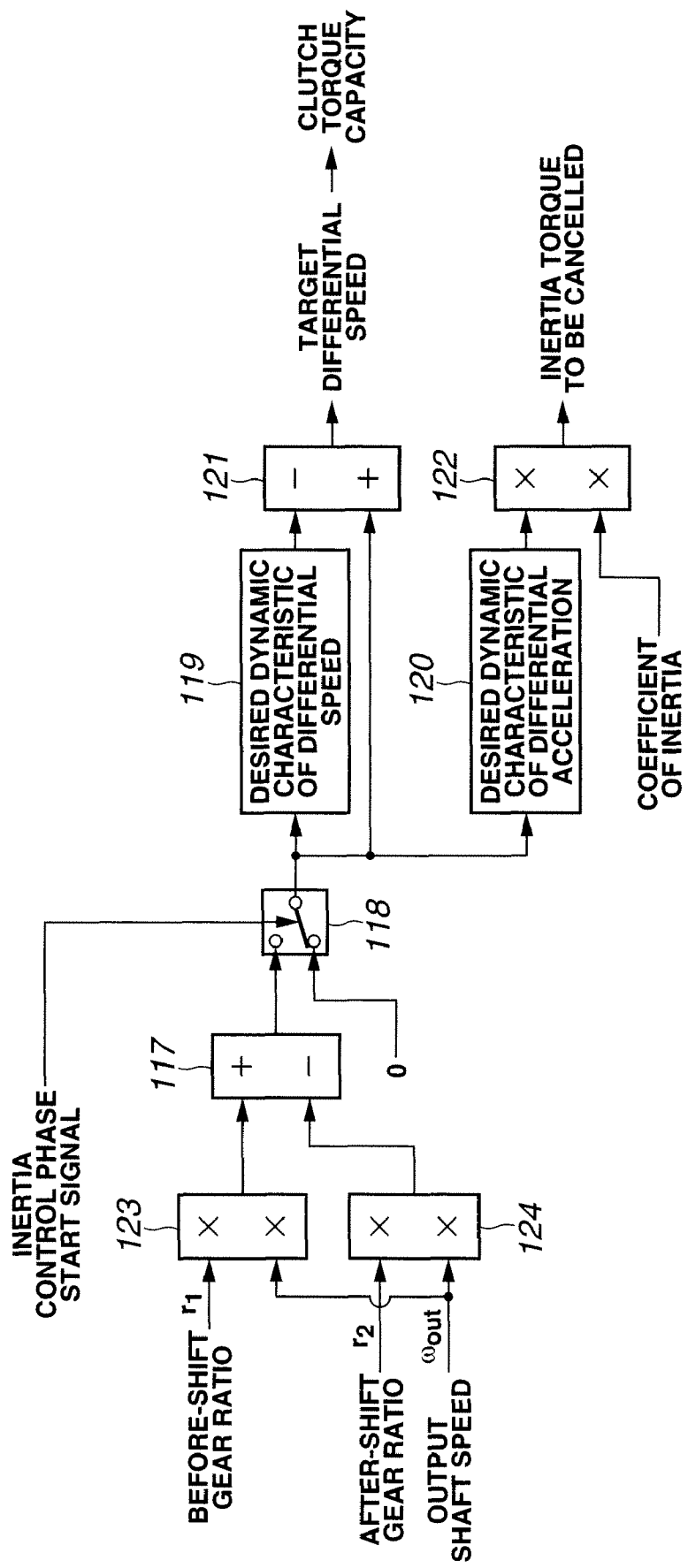
FIG. 17 is a block diagram showing a section of the shift control apparatus of FIG. 1 for computing a target differential speed with a desired dynamic characteristic in accordance with a modified example of the second embodiment.
Figure 18:
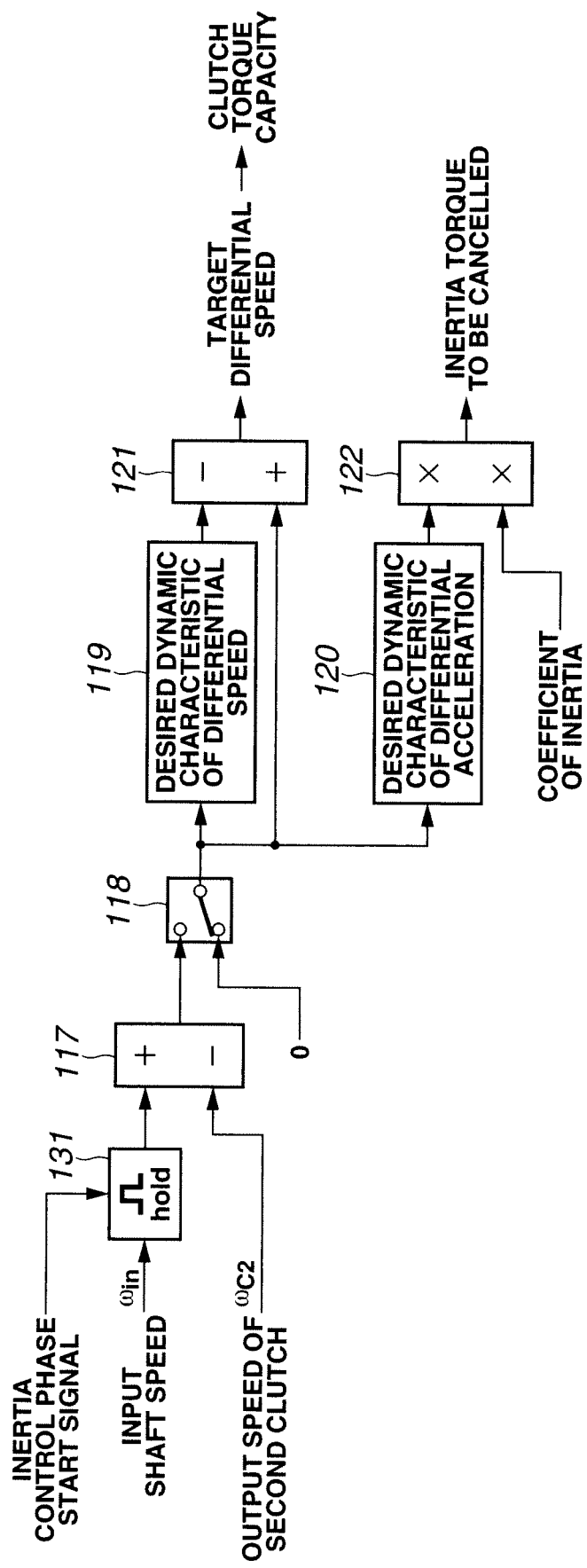
FIG. 18 is a block diagram showing a section of the shift control apparatus of FIG. 1 for computing a target differential speed with a desired dynamic characteristic in accordance with another modified example of the second embodiment.

FIGS. 16 to 18 show three examples of a section of the shift control apparatus for computing a target input shaft speed (or a target differential speed between the input and output of a clutch) with a desired dynamic characteristic. In FIG. 16, a calculator 117 calculates an overall speed change of the input shaft speed resulting from the upshift ($\omega_{C1}-\omega_{C2}$) on the basis of first clutch output speed $\omega_{C1}$ and second clutch output speed $\omega_{C2}$. An output controller (switch) 118 outputs the overall speed change ($\omega_{C1}-\omega_{C2}$) after an inertia control phase start signal is inputted into output controller 118, and outputs a signal indicative of zero until the inertia control phase start signal is inputted. While output controller 118 outputs the signal indicative of zero, input shaft speed $\omega_{in}$ is uncontrolled. After the inertia control phase start signal is inputted, a target differential speed dynamic characteristic section 119 receives the overall speed change ($\omega_{C1}-\omega_{C2}$), and imparts a dynamic characteristic to the target differential speed as described below in detail. A target differential acceleration dynamic characteristic section 120 receives the overall speed change ($\omega_{C1}-\omega_{C2}$), and imparts a dynamic characteristic to a target differential acceleration as described below in detail. A differential acceleration of a clutch is defined as a rate of change of a differential speed between the input and output of the clutch.

The target differential speed dynamic characteristic section 119 determines a desired change in the differential speed of the second clutch so that the desired change varies every control cycle, and that the differential speed in the second clutch (or input shaft speed $\omega_{in}$) changes along a curved line. A calculator 121 receives the desired change, and calculates a target differential speed by subtracting the desired change from the overall speed change ($\omega_{C1}-\omega_{C2}$). Specifically, target differential speed dynamic characteristic section 119 controls the desired change in the differential speed in the second clutch per control cycle to be small at the start of the inertia control phase, to increase gradually with time in the first half, to decrease gradually with time in the second half, and to be small at the end of the inertia control phase.

The target differential acceleration dynamic characteristic section 120 stores a desired dynamic characteristic of the differential acceleration of the second clutch which is beforehand obtained by differentiating the dynamic characteristic of the target differential speed, and determines a desired differential acceleration in the second clutch. A calculator 122 multiplies the desired differential acceleration in the second clutch by a coefficient of inertia to obtain the to-be-cancelled inertia torque. Thus, controller 1 determines a desired path of change of input shaft speed $\omega_{in}$ through the gear shift; determines a target rate of change of the input speed in accordance with the desired path; and determines the inertia torque in accordance with the target rate of change of the input speed.

In FIG. 17, the required speed change through the inertia control phase is calculated on the basis of the output shaft speed $\omega_{out}$, before-shift transmission gear ratio $r_1$, and after-shift transmission gear ratio $r_2$. A calculator 123 calculates the first clutch output speed $\omega_{C1}$ by multiplying the before-shift transmission gear ratio $r_1$ and the output shaft speed $\omega_{out}$. A calculator 124 calculates the second clutch output speed $\omega_{C2}$ by multiplying the after-shift transmission gear ratio $r_2$ and the output shaft speed $\omega_{out}$. The remaining sections in FIG. 17 are the same as in FIG. 16.

In FIG. 18, the required speed change through the inertia control phase is calculated on the basis of the input shaft speed $\omega_{in}$ and the second clutch output speed $\omega_{C2}$. A holder 131 specifies and stores a value of the input shaft speed $\omega_{in}$ when the inertia control phase start signal is inputted. The calculator 117 calculates the overall speed change by subtracting the second clutch output speed $\omega_{C2}$ from the stored value of the input shaft speed $\omega_{in}$. The remaining sections in FIG. 18 are the same as in FIG. 16. The example of FIG. 18 may be combined with the example of FIG. 17. Specifically, controller 1 may be configured to: store a value of input shaft speed $\omega_{in}$ when the inertia control phase start signal is inputted; determine a reference speed in accordance with the after-shift transmission gear ratio $r_2$ and input shaft speed $\omega_{out}$; and determine the overall speed change as a difference between the stored value and the reference speed.

Figure 19:
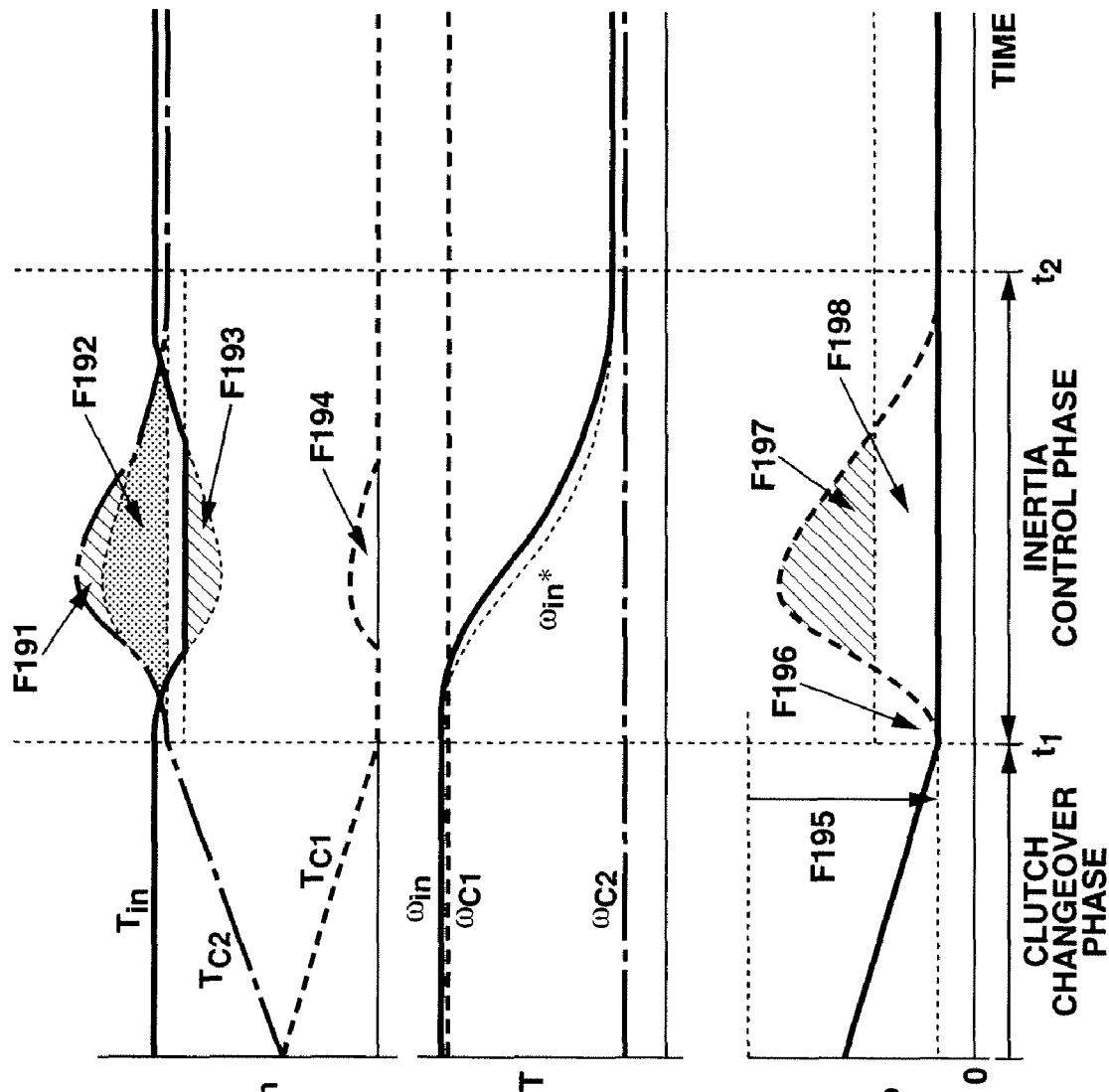
FIGS. 19A, 19B and 19C are time charts showing an example of how the input torque, input shaft speed and output torque change with time under control during an upshift in accordance with the second embodiment.
Figure 20:
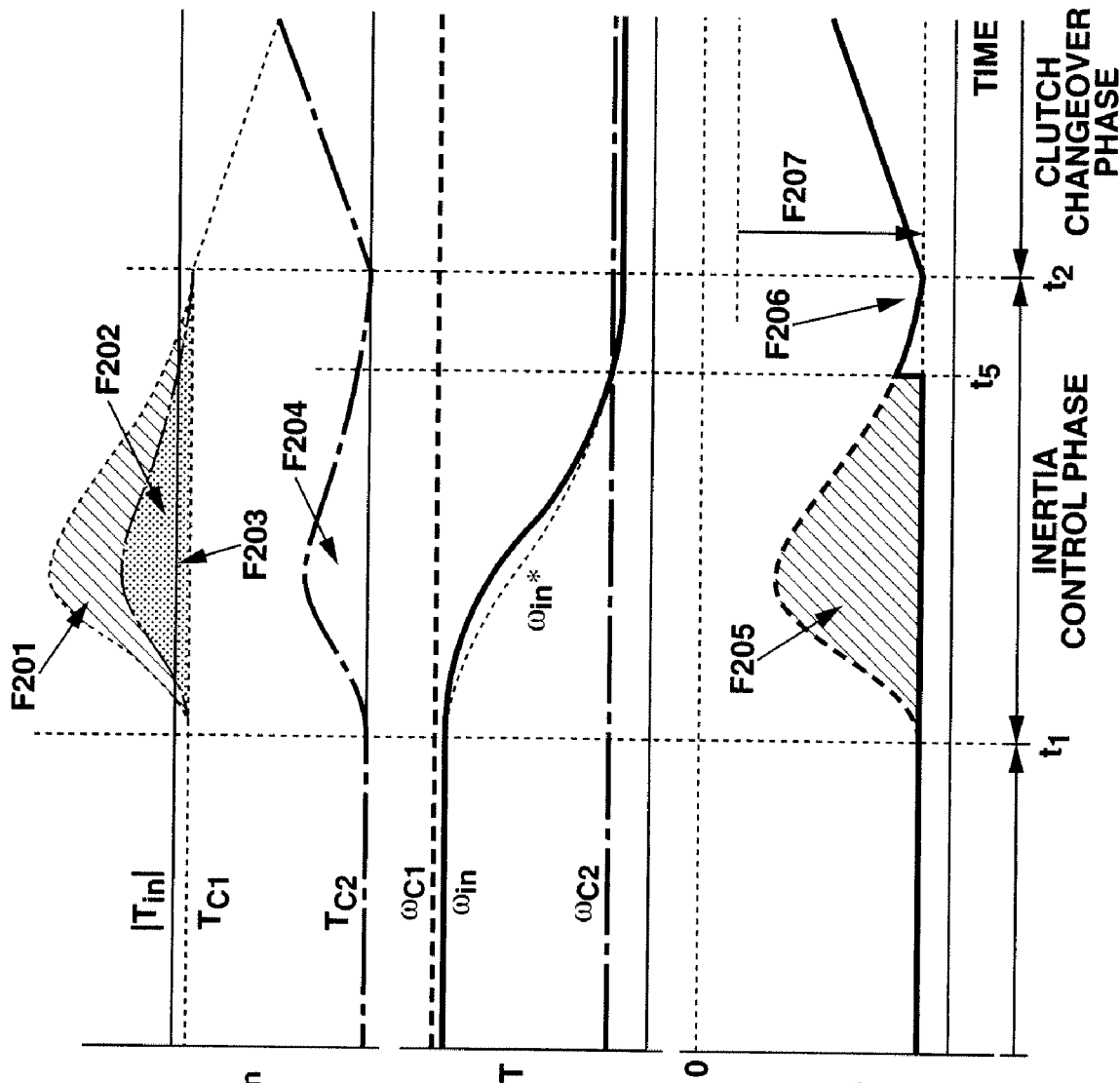
FIGS. 20A, 20B and 20C are time charts showing another example of how the input torque, input shaft speed and output torque change with time under control during an upshift in accordance with the second embodiment.

The thus-constructed shift control apparatus operates to cancel an inertia torque during an upshift of the automatic transmission as follows. Each of FIGS. 19A and 20A shows how the input torque $T_{in}$ changes with time, where a solid line represents the input torque $T_{in}$, a dashed line represents the torque capacity (or transmitted torque) of the first clutch (to-be-disengaged clutch) $T_{C1}$, and a long dashed short dashed line represents the torque capacity (or transmitted torque) of the second clutch (to-be-engaged clutch) $T_{C2}$. Each of FIGS. 19B and 20B shows how the input shaft speed $\omega_{in}$ changes with time, where a solid line represents the input shaft speed $\omega_{in}$, a dashed line represents the output speed of the first clutch $\omega_{C1}$, a long dashed short dashed line represents the output speed of the second clutch $\omega_{C2}$. Each of FIGS. 19C and 20C shows how the output torque $T_o$ changes with time. FIGS. 19A to 20C show changes from before the time instant $t_1$ at which the inertia control phase starts.

In the example of FIGS. 19A to 19C, an under-acceleration upshift is implemented by a prior clutch changeover phase and a subsequent inertia control phase. As shown in FIG. 19A, input torque $T_{in}$ is reduced by engine torque reduction control during the inertia control phase. Input torque $T_{in}$ starts to decrease slowly at the start of the inertia control phase. The reduction in the input torque $T_{in}$ is limited, although a further reduction is desired as indicated by F193. In order to implement the speed reduction of input shaft speed $\omega_{in}$, the torque capacity of the to-be-engaged clutch $T_{C2}$ is increased and maintained above the input torque $T_{in}$ as indicated by F192. The torque capacity of the to-be-disengaged clutch $T_{C1}$ and to-be-engaged clutch $T_{C2}$ are further increased as indicated by hatched patterns of F191 and F194. As shown in FIG. 19C, the output torque $T_o$ decreases gradually due to the difference between the before-shift and after-shift transmission gear ratios during the clutch changeover phase as indicated by F195, and then is held constant after that. Thus, the engine-based torque reduction serves to cancel a portion of the output torque $T_o$ as indicated by F198, while the clutch-based torque reduction serves to cancel another portion of the output torque $T_o$ as indicated by F197. In this example, even when input shaft speed $\omega_{in}$ is higher than first clutch output speed $\omega_{C1}$ so that it is impossible to cancel the inertia torque by clutch engagement, there is no instantaneous increase in output torque $T_o$, as indicated by F196, because the rate of change of input shaft speed $\omega_{in}$ is controlled to be close to zero at the start of the inertia control phase.

In the example of FIGS. 20A to 20C, an under-deceleration upshift is implemented by a prior inertia control phase and a subsequent clutch changeover phase. As shown in FIG. 20A, the absolute value of input torque $T_{in}$ is held constant with no engine-based torque reduction during the inertia control phase as indicated by F203. A time instant $t_5$ is when the input shaft speed $\omega_{in}$ decreases below the second clutch output speed $\omega_{C2}$ In order to implement the speed reduction of input shaft speed $\omega_{in}$, the torque capacity of the to-be-engaged clutch $T_{C2}$ is increased and maintained above the input torque $T_{in}$ as indicated by F202. The torque capacity of the to-be-disengaged clutch $T_{C1}$ and to-be-engaged clutch $T_{C2}$ are further increased as indicated by hatched patterns of F201 and F204. As shown in FIG. 20C, the output torque $T_o$ is held constant during the inertia control phase except a slight instantaneous increase (decrease in magnitude) over a time interval from time instant $t_5$ to time instant $t_2$ as indicated by F206, and decreases in magnitude due to the difference between the before-shift and after-shift transmission gear ratios during the clutch changeover phase as indicated by F207. Thus, the clutch-based torque reduction serves to cancel a portion of the output torque $T_o$ as indicated by F205. The instantaneous increase in output torque $T_o$ during the time interval from time instant $t_5$ to time instant $t_2$ as indicated by F206 is small, because the rate of change of input shaft speed $\omega_{in}$ is controlled to be close to zero at the end of the inertia control phase.

The provision of the dynamic characteristics of the input shaft speed serves to control a gear shift by a universal logic independently of the relationship between the input shaft speed $\omega_{in}$, first clutch output speed $\omega_{C1}$ and second clutch output speed $\omega_{C2}$, and to control suitably the timing of clutch engagement or clutch disengagement. In this embodiment, two different kinds of dynamic characteristics are provided. The first dynamic characteristic concerns the target input shaft speed (or target differential speed), while the second dynamic characteristic concerns the rate of change of the target input shaft speed (or target differential acceleration). The first dynamic characteristic is used to determine a path of change in the target input shaft speed. The second dynamic characteristic is prepared beforehand by differentiating the first dynamic characteristic. The second dynamic characteristic is used to calculate the desired rate of change of the input shaft speed on the basis of the required speed change through the gear shift. The provision of the first and second dynamic characteristics serves to calculate the desired rate of change of the input shaft speed with no differentiating calculation, and to carry out the required calculations in a stable manner, preventing noises from adversely affecting the on-time calculation results.

Figure 21:
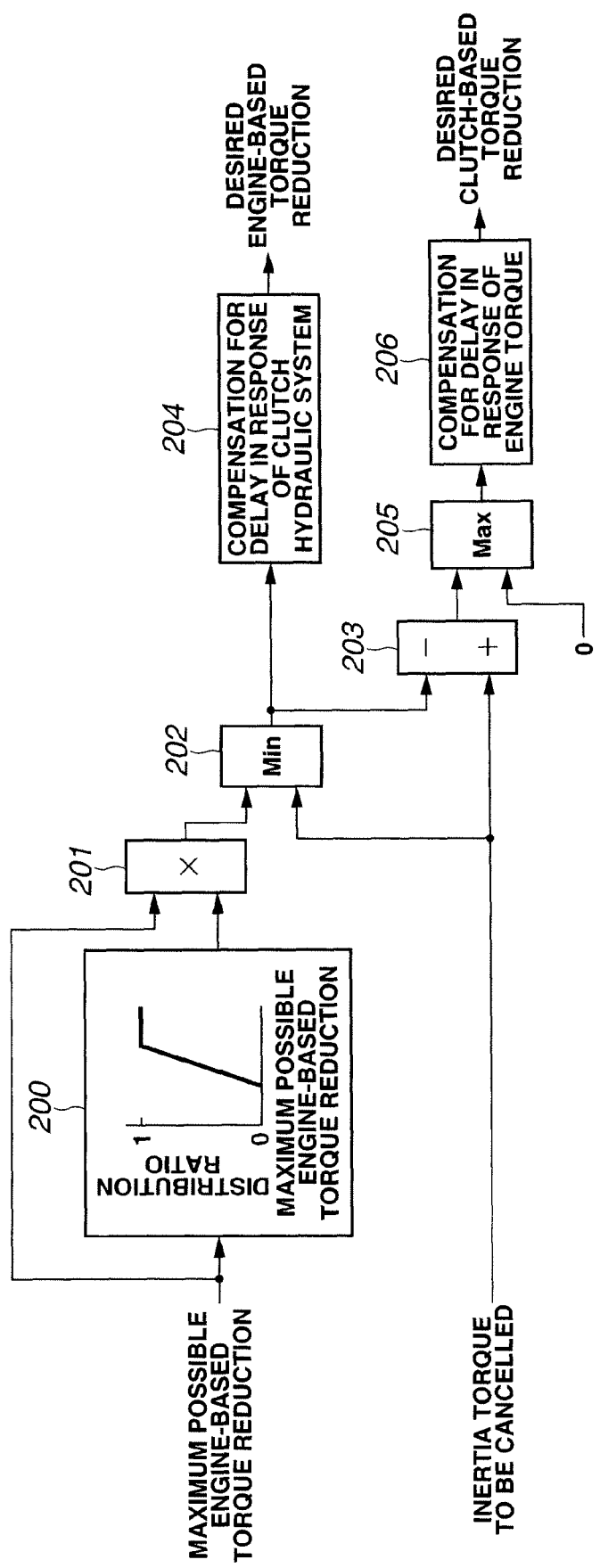
FIG. 21 is a block diagram showing a modification of the section of the shift control apparatus of FIG. 12.

FIG. 21 shows a modification of the section of the shift control apparatus of FIG. 12. In FIG. 21, a map section 200 determines a distribution ratio on the basis of the maximum possible engine-based torque reduction for inertia torque cancellation. A calculator 201 calculates a basic desired engine-based torque reduction by multiplying the distribution ratio and the maximum possible engine-based torque reduction. A comparator 202 compares the basic desired engine-based torque reduction with the to-be-cancelled inertia torque, and outputs the smaller one of the two as a second basic desired engine-based torque reduction. A calculator 203 calculates a basic desired clutch-based torque reduction by subtracting the second basic desired engine-based torque reduction from the to-be-cancelled inertia torque. A calculator 204 determines a final desired engine-based torque reduction by providing a compensation for delay in response of the hydraulic system for the clutch set. A comparator 205 compares zero with the basic desired clutch-based torque reduction, and outputs the larger one of the two. A calculator 206 determines a final desired clutch-based torque reduction by providing a compensation for delay in response of the engine torque. The distribution ratio is set so that the clutch-based torque reduction is dominant when the maximum possible engine-based torque reduction is small and less effective, and the engine-based torque reduction is dominant when the maximum possible engine-based torque reduction is sufficiently large and effective. The two compensations in the calculators 204 and 206 serve to synchronize the timing of operation of the engine and the clutch set with one another.

Figure 22:
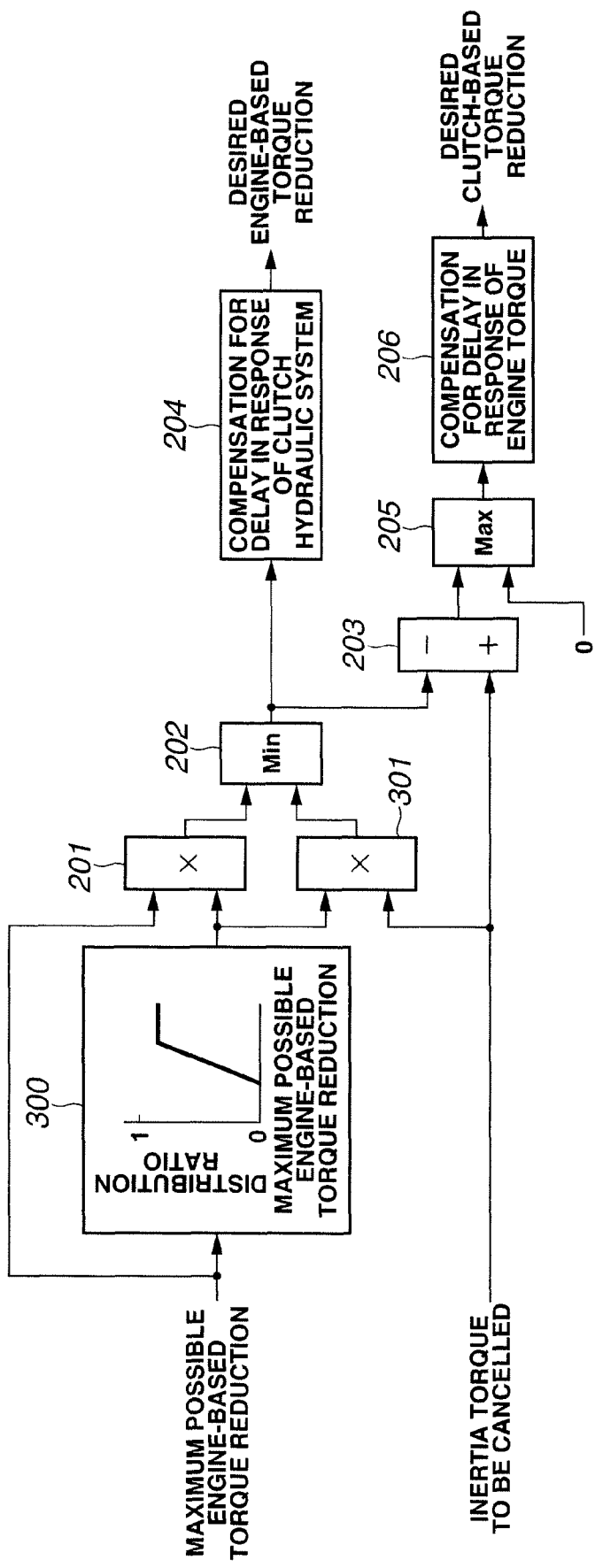
FIG. 22 is a block diagram showing another modification of the section of the shift control apparatus of FIG. 12.

FIG. 22 shows another modification of the section of the shift control apparatus of FIG. 12. This modification differs from the modification of FIG. 21 as follows. In FIG. 22, a map section 300 determines a distribution ratio on the basis of the maximum possible engine-based torque reduction for inertia torque cancellation. The distribution ratio is set to be constantly smaller than one, in contrast to the case of FIG. 21. A calculator 301 calculates an output value by multiplying the distribution ratio and the to-be-cancelled inertia torque. Comparator 202 compares the basic desired engine-based torque reduction (calculated by multiplying the maximum possible engine-based torque reduction and the distribution ratio in calculator 201) with the output value of calculator 301, and outputs the smaller one of the two as a second basic desired engine-based torque reduction. Naturally, the second basic desired engine-based torque reduction is constantly smaller than the to-be-cancelled inertia torque. Thus, the desired clutch-based torque reduction is set to a non-zero value at least above the product of the to-be-cancelled inertia torque and the value of (1-maximum distribution ratio), even when the to-be-cancelled inertia torque can be totally covered by engine-based torque reduction.

When the maximum possible value of the engine-based torque reduction is equal to a non-zero value, the distribution ratio may be determined to be smaller than one and larger than zero. When the maximum possible value is equal to zero, the distribution ratio may be changed gradually with time toward zero. When the maximum possible value is larger than zero and smaller than a reference value, the engine-based torque reduction may be determined by multiplying the inertia torque by the distribution ratio. When the maximum possible value of the second portion of the inertia torque is larger than a reference value, the distribution ratio may be changed gradually with time toward one. The foregoing causes no instantaneous and rapid shift in the state of the transmission during the inertia torque cancellation, thereby preventing possible resulting fluctuations in speed and torque.

Although the foregoing description concerns the simplified two-speed transmission shown in FIG. 5, a shift control apparatus may be constructed for other different types of transmissions such as the four-speed automatic transmission shown in FIG. 2. This may be implemented by replacing the input shaft speed $\omega_{in}$ of the two-speed transmission by the input speed of each clutch of the four-speed automatic transmission, and by calculating a clutch torque capacity correction for canceling an inertia torque with respect to an uncorrected torque capacity of each clutch.

This application is based on a prior Japanese Patent Application No. 2006-196135 filed on Jul. 18, 2006. The entire contents of this Japanese Patent Application No. 2006-196135 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An automatic transmission comprising:
an input section for receiving an input torque from a drive unit;
an output section;
a first frictional engagement element having an engaged state allowing the output section to rotate at a first transmission gear ratio with respect to the input section;
a second frictional engagement element having an engaged state allowing the output section to rotate at a second transmission gear ratio with respect to the input section; and
a controller for controlling a gear shift from the first transmission gear ratio to the second transmission gear ratio, the controller being configured to control the first and second frictional engagement elements so as to cancel at least a first portion of an inertia torque resulting from the gear shift, wherein:
the gear shift is an upshift;
the first frictional engagement element has a disengaged state allowing the output section to rotate at the second transmission gear ratio with respect to the input section;
the second frictional engagement element has a disengaged state allowing the output section to rotate at the first transmission gear ratio with respect to the input section; and
the controller is configured to control the first and second frictional engagement elements toward their respective engaged states in parallel so as to cancel the first portion of the inertia torque.

2. The automatic transmission as claimed in claim 1, wherein the controller is configured to control the drive unit so as to cancel a second portion of the inertia torque.

3. An automatic transmission comprising:
an input section for receiving an input torque from a drive unit;
an output section;
a first frictional engagement element having an engaged state allowing the output section to rotate at a first transmission gear ratio with respect to the input section;
a second frictional engagement element having an engaged state allowing the output section to rotate at a second transmission gear ratio with respect to the input section; and
a controller for controlling a gear shift from the first transmission gear ratio to the second transmission gear ratio, the controller being configured to control the first and second frictional engagement elements so as to cancel at least a first portion of an inertia torque resulting from the gear shift,
wherein the controller is configured to:
control the drive unit so as to cancel a second portion of the inertia torque;
control the first and second frictional engagement elements so as to cancel the inertia torque other than the second portion;
determine a maximum possible value of the second portion of the inertia torque;
when the maximum possible value is equal to a non-zero value, determine a distribution ratio smaller than one and larger than zero; and
determine the second portion of the inertia torque by multiplying the inertia torque by the distribution ratio.

4. The automatic transmission as claimed in claim 3, wherein the controller is configured to change the distribution ratio gradually with time toward zero, when the maximum possible value of the second portion of the inertia torque is equal to zero.

5. The automatic transmission as claimed in claim 3, wherein the controller is configured to determine the second portion of the inertia torque by multiplying the inertia torque by the distribution ratio, when the maximum possible value of the second portion of the inertia torque is larger than zero and smaller than a reference value.

6. The automatic transmission as claimed in claim 3, wherein the controller is configured to change the distribution ratio gradually with time toward one, when the maximum possible value of the second portion of the inertia torque is larger than a reference value.

7. The automatic transmission as claimed in claim 2, wherein the controller is configured to compensate for delay in response of the drive unit and the first and second frictional engagement elements, when controlling the drive unit and the first and second frictional engagement elements.

8. The automatic transmission as claimed in claim 1, wherein the controller is configured to:
control the drive unit so as to cancel a second portion of the inertia torque;
maximize the second portion of the inertia torque; and
control the first and second frictional engagement elements so as to cancel the inertia torque other than the second portion.

9. The automatic transmission as claimed in claim 1, wherein the controller is configured to:
determine first and second torque capacity corrections in accordance with the first and second transmission gear ratios; and
implement the controlling the first and second frictional engagement elements by correcting a torque capacity of the first frictional engagement element by the first torque capacity correction, and by correcting a torque capacity of the second frictional engagement element by the second torque capacity correction.

10. The automatic transmission as claimed in claim 9, wherein the controller is configured to determine the first and second torque capacity corrections by using the following equations:

$$\Delta C_1 = \frac{r_2}{r_2 - r_1} I_{in} \dot{\omega}_{in}$$

$$\Delta C_2 = \frac{r_1}{r_2 - r_1} I_{in} \dot{\omega}_{in}$$

where:

$\Delta C_1$ represents the first torque capacity correction;

$\Delta C_2$ represents the second torque capacity correction;

$r_1$ represents the first transmission gear ratio;

$r_2$ represents the second transmission gear ratio; and $I_{in}\dot{\omega}_{in}$ represents the at least a first portion of the inertia torque.

11. The automatic transmission as claimed in claim 10, wherein the controller is configured to correct the first and second torque capacity corrections by multiplying by a correction factor smaller than one.

12. The automatic transmission as claimed in claim 11 for a motor vehicle, wherein the controller is configured to vary the correction factor in accordance with a vehicle speed of the motor vehicle.

13. The automatic transmission as claimed in claim 1, wherein the controller is configured to:

determine whether or not a condition that an input speed of the first frictional engagement element is lower than an output speed thereof and an input speed of the second frictional engagement element is higher than an output speed thereof holds; and when determining that the condition holds, control the first and second frictional engagement elements toward their respective engaged states in parallel so as to cancel the first portion of the inertia torque.

14. The automatic transmission as claimed in claim 1, wherein the controller is configured to:

determine a desired path of change of an input speed through the gear shift;

determine a target rate of change of the input speed in accordance with the desired path; and determine the inertia torque in accordance with the target rate of change of the input speed.

15. The automatic transmission as claimed in claim 1, wherein the controller is configured to:

store information concerning a desired dynamic characteristic of rate of change of an input speed;

determine an overall speed change of the input speed resulting from the gear shift;

determine a target rate of change of the input speed in accordance with the overall speed change and the desired dynamic characteristic; and determine the inertia torque in accordance with the target rate of change of the input speed.

16. The automatic transmission as claimed in claim 15, wherein the controller is configured to determine the overall speed change as a difference between an output speed of the first frictional engagement element and an output speed of the second frictional engagement element.

17. The automatic transmission as claimed in claim 15, wherein the controller is configured to:

store a value of an input speed of the second frictional engagement element when the gear shift starts; and determine the overall speed change as a difference between the stored value and an output speed of the second frictional engagement element.

18. The automatic transmission as claimed in claim 15, wherein the controller is configured to:

determine a first reference speed in accordance with the first transmission gear ratio and a speed of the output section;

determine a second reference speed in accordance with the second transmission gear ratio and the speed of the output section; and determine the overall speed change as a difference between the first and second reference speeds.

19. The automatic transmission as claimed in claim 15, wherein the controller is configured to:

store a value of an input speed of the second frictional engagement element when the gear shift starts;

determine a reference speed in accordance with the second transmission gear ratio and a speed of the output section; and determine the overall speed change as a difference between the stored value and the reference speed.

20. An apparatus of controlling an automatic transmission comprising: an input section for receiving an input torque from a drive unit; an output section; a first frictional engagement element having an engaged state allowing the output section to rotate at a first transmission gear ratio with respect to the input section; and a second frictional engagement element having an engaged state allowing the output section to rotate at a second transmission gear ratio with respect to the input section, the apparatus comprising:

a controller for controlling a gear shift from the first transmission gear ratio to the second transmission gear ratio, the controller being configured to control the first and second frictional engagement elements so as to cancel at least a first portion of an inertia torque resulting from the gear shift wherein:

the gear shift is an upshift;

the first frictional engagement element has a disengaged state allowing the output section to rotate at the second transmission gear ratio with respect to the input section;

the second frictional engagement element has a disengaged state allowing the output section to rotate at the first transmission gear ratio with respect to the input section; and the controller is configured to control the first and second frictional engagement elements toward their respective engaged states in parallel so as to cancel the first portion of the inertia torque.

21. A method of controlling an automatic transmission comprising: an input section for receiving an input torque from a drive unit; an output section; a first frictional engagement element having an engaged state allowing the output section to rotate at a first transmission gear ratio with respect to the input section; a second frictional engagement element having an engaged state allowing the output section to rotate at a second transmission gear ratio with respect to the input section; and a controller for controlling a gear shift from the first transmission gear ratio to the second transmission gear ratio, wherein: the gear shift is an upshift; the first frictional engagement element has a disengaged state allowing the output section to rotate at the second transmission gear ratio with respect to the input section; and the second frictional engagement element has a disengaged state allowing the output section to rotate at the first transmission gear ratio with respect to the input section, the method comprising:

controlling the first and second frictional engagement elements toward their respective engaged states in parallel so as to cancel at least a first portion of an inertia torque resulting from the gear shift.

22. The automatic transmission as claimed in claim 2, wherein the controller is configured to:

control the first and second frictional engagement elements so as to cancel the inertia torque other than the second portion;

determine a maximum possible value of the second portion of the inertia torque;

when the maximum possible value is equal to a non-zero value, determine a distribution ratio smaller than one and larger than zero; and determine the second portion of the inertia torque by multiplying the inertia torque by the distribution ratio.

23. The automatic transmission as claimed in claim 22, wherein the controller is configured to change the distribution ratio gradually with time toward zero, when the maximum possible value of the second portion of the inertia torque is equal to zero.

24. The automatic transmission as claimed in claim 22, wherein the controller is configured to determine the second portion of the inertia torque by multiplying the inertia torque by the distribution ratio, when the maximum possible value of the second portion of the inertia torque is larger than zero and smaller than a reference value.

25. The automatic transmission as claimed in claim 22, wherein the controller is configured to change the distribution ratio gradually with time toward one, when the maximum possible value of the second portion of the inertia torque is larger than a reference value.

* * * * *